US010640233B2

(12) United States Patent
Miller et al.

(10) Patent No.: US 10,640,233 B2
(45) Date of Patent: May 5, 2020

(54) SYSTEMS, METHODS, AND DEVICES IMPROVING SAFETY AND FUNCTIONALITY OF CRAFT HAVING ONE OR MORE ROTORS

(71) Applicants: Ralph Irad Miller, Arlington, VA (US); Wannett Smith Ogden Miller, Arlington, VA (US)

(72) Inventors: Ralph Irad Miller, Arlington, VA (US); Wannett Smith Ogden Miller, Arlington, VA (US)

(*) Notice: Subject to any disclaimer, the term of this patent is extended or adjusted under 35 U.S.C. 154(b) by 0 days.

(21) Appl. No.: 15/963,847

(22) Filed: Apr. 26, 2018

(65) Prior Publication Data

US 2018/0312276 A1    Nov. 1, 2018

Related U.S. Application Data

(60) Provisional application No. 62/491,145, filed on Apr. 27, 2017, provisional application No. 62/512,784, (Continued)

(51) Int. Cl.
*B64C 39/02* (2006.01)
*B64C 31/06* (2020.01)
*B64F 1/12* (2006.01)

(52) U.S. Cl.
CPC .............. *B64F 1/125* (2013.01); *B64C 31/06* (2013.01); *B64C 39/022* (2013.01); (Continued)

(58) Field of Classification Search
CPC ........ B64C 2201/107; B64C 2201/108; B64C 37/02; B64C 31/032; B64C 31/036; B64C 31/06
See application file for complete search history.

(56) References Cited

U.S. PATENT DOCUMENTS 3,149,803 A    9/1964  Petrides et al.
4,601,444 A    7/1986  Lindenbaum
(Continued)

FOREIGN PATENT DOCUMENTS

CN    206012932 U    3/2017
WO    2007141795 A1    12/2007

OTHER PUBLICATIONS

Erik Sofge, The Joy of Flying a Remote-Control Kite, Wall Street Journal, Mar. 30, 2016.
(Continued)

*Primary Examiner* — Philip J Bonzell
*Assistant Examiner* — Tye William Abell
(74) *Attorney, Agent, or Firm* — Ditthavong & Steiner, P.C.

(57) ABSTRACT

This application describes systems, methods, and devices to enhance the safety and functionality of unmanned rotorcraft by improving reliability, transparency, operational capabilities, and effectiveness. Embodiments include integration of rotorcraft with objects attached to the ground (including kites, balloons, or elevated structures) in order to create safe and visible sky moorings from which devices such as cameras on the craft can operate for extended periods of time while remote control can be used to move and stabilize the camera and/or the kite or balloon to which it is attached. In addition, the rotorcraft in such sky moorings can be enclosed for protection, can employ connections for systems maintenance, and can utilize changeable payload modules having supplies that the rotorcraft can dispatch or use in various contexts such as emergency situations or to provide security at venues with large gatherings of people, such as concerts.

11 Claims, 28 Drawing Sheets

Related U.S. Application Data filed on May 31, 2017, provisional application No. 62/540,007, filed on Aug. 1, 2017, provisional application No. 62/593,008, filed on Nov. 30, 2017.

(52) U.S. Cl.
CPC ...... *B64C 39/024* (2013.01); *B64C 2201/027* (2013.01); *B64C 2201/066* (2013.01); *B64C 2201/107* (2013.01); *B64C 2201/108* (2013.01); *B64C 2201/127* (2013.01); *B64C 2201/148* (2013.01)

(56) References Cited

U.S. PATENT DOCUMENTS

| 9,864,372 | B2 | 1/2018 | Chen et al. | |
|---|---|---|---|---|
| 2010/0013226 | A1* | 1/2010 | Blumer | B64B 1/50 290/44 |
| 2014/0091176 | A1 | 4/2014 | McGeer et al. | |
| 2015/0210386 | A1* | 7/2015 | Vander Lind | B64C 31/06 244/110 C |
| 2015/0212391 | A1* | 7/2015 | Waibel | G03B 15/006 701/2 |
| 2015/0329204 | A1* | 11/2015 | Nelson | B64C 27/26 244/6 |
| 2016/0144958 | A1 | 5/2016 | Woodworth et al. | |
| 2016/0200437 | A1 | 7/2016 | Ryan et al. | |
| 2016/0272316 | A1* | 9/2016 | Nelson | B64C 39/024 |

OTHER PUBLICATIONS

Notification of Transmittal of The International Search Report and The Written Opinion of The International Searching Authority, or The Declaration; International Search Report and Written Opinion for related International Patent Application No. PCT/2018/029629, dated Sep. 4, 2018, 23 pages.

\* cited by examiner

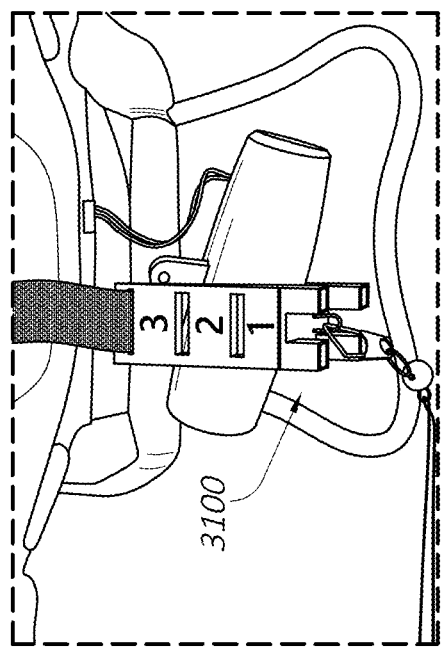
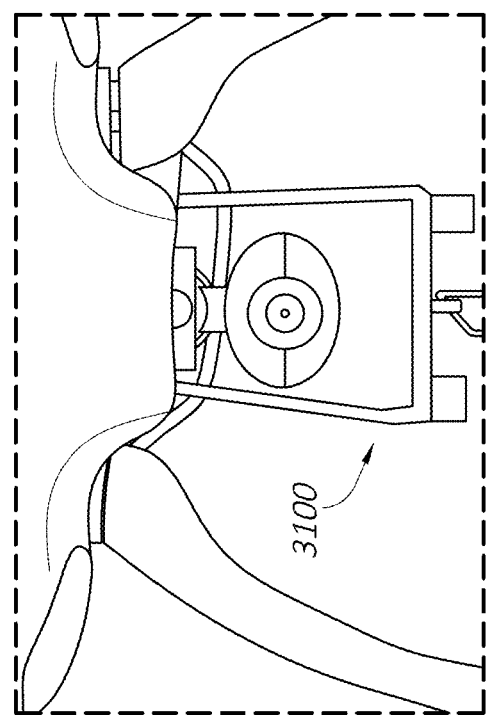
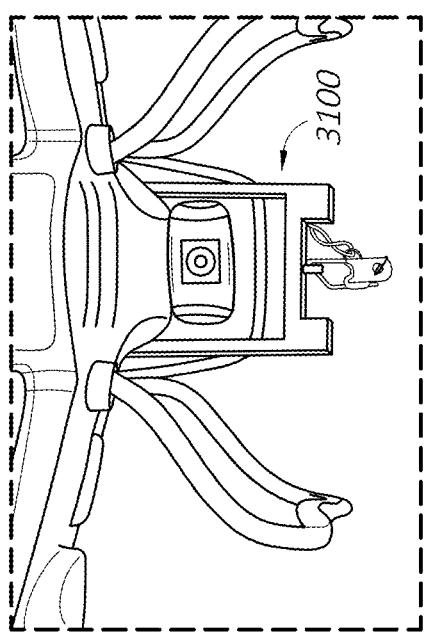
FIG. 32

SYSTEMS, METHODS, AND DEVICES IMPROVING SAFETY AND FUNCTIONALITY OF CRAFT HAVING ONE OR MORE ROTORS

This application claims priority to U.S. Patent Application Nos. 62/491,145, filed on Apr. 27, 2017; 62/512,784, filed on May 31, 2017; 62/540,007, filed on Aug. 1, 2017; and 62/593,008, filed on Nov. 30, 2017. Each of these applications is incorporated herein by reference in their entireties.

BACKGROUND

This application deals with improvements in safety and functionality for unmanned rotorcraft. Safety is promoted by improvements that reduce flyaway risk while enhancing accountability or that position a multicopter for deployment from an elevated position, and functionality is increased by overcoming limitations on flight duration and lifting capabilities. Recent years have seen an increase in the popularity of unmanned aircraft, which are guided remotely. These unmanned aircraft are sometimes referred to as "drones," and come in a plurality of forms including rotorcraft that use lift generated by rotating blades, referred to as rotors. Multirotor aircraft are those that have multiple lifting rotors, with names such as quadcopter and hexacopter to refer to aircraft with 4 and 6 lifting blades respectively. Rotorcraft with more than six blades are also known. Present implementations of such unmanned aircraft, while popular and providing recreational value and other utility, pose dangers and have limitations.

One major source of danger is uncontrolled flyaways, which can interfere with manned aircraft or cause injury from crashes, as well as ecological damage from unretrieved craft in trees, bodies of water, or other locations. Even if no actual personal injury or property damage results from an uncontrolled flyaway, there can be harm and irritation to the public from fear and anticipation of loss of control, especially when operators who cannot properly fly the craft operate them in an erratic manner near others. In addition, operators also suffer economic loss if the craft are destroyed or lost. And while unmanned aircraft can be destroyed or lost based on operator error, they can also suffer these fates under windy or gusty conditions. Present versions of unmanned rotorcraft that can be operated from an undisclosed location also threaten rights of non-operators through their lack of accountability, which can permit invasion of privacy when cameras are included in the craft and operators can hide themselves while illegally observing others.

Due to some of these dangers and risks, the Federal Aviation Administration ("FAA") regulates (or in some locations, completely prohibits) the use of unmanned aircraft. Some of the regulations restrict the weight of the aircraft, and where and when they can be operated. The FAA also has rules and restrictions on other flying devices, such as kites and balloons. Specifically, the agency defines "kites" as "a framework, covered with paper, cloth, metal, or other material, intended to be flown at the end of a rope or cable, and having as its only support the force of the wind moving past its surfaces." While kites provide enjoyment and do not have some of the drawbacks described above with unmanned aircraft (e.g., they can be flown in windier conditions and are tethered to a rope or cable), their operation is somewhat limited based on wind conditions and the manipulation of the rope or cable by the operator. The FAA allows use of "kites" or tethered balloons in locations where it restricts use of "unmanned aircraft." Localities also impose restrictions on use of "drones" in areas where "kites" are allowed, such as Griffith Park near Los Angeles.

Two related limitations on the safety and functionality of unmanned aircraft arise from limited flight durations and low payload capacities. Many rotorcraft use batteries rather than gasoline engines. Electric power has many benefits over use of internal combustion engines (including lower noise and pollution, simplicity of starting, easier maintenance, and greater reliability), but the capacity and weight of existing batteries limits flight time to the discharge time of the batteries and restricts payload capacity. Short flight times and limited payload capacity, however, interfere with potential uses for the rotorcraft by, for example, public safety officials, naturalists, fishermen, journalists, and photographers. These individuals who observe crowds to watch for suspicious behavior, wait for wildlife or fish to enter a scene, wait for a newsworthy event, or wait for events to reach a time when aerial photography is needed (such as the time a wedding party exits a wedding ceremony) may not be able to use such rotorcraft if the batteries powering the craft last a short time and the craft must be launched from a safe position away from people or ground obstacles. Also, the limited payload capacity for unmanned copters (particularly if affordable and reasonably small) mean that only a few additional capabilities unrelated to flight and control (such as devices discussed below to treat medical emergencies or assist in rescue operations) can be added to any particular copter. Kites, while able to stay aloft in a steady wind for hours with relatively large payloads, can only do so in a relatively limited area, are too unsteady to function effectively as platforms for aerial photography, and cannot be "dispatched" to a different location. Similarly, traditional security cameras or other security devices can be mounted on towers or other elevated structures, but they lack the capability to examine an area of concern closely, to have two-way communications with people in distress or causing disruption, or to deliver medications or activate devices with precision during a crisis.

The systems, methods and devices described in this disclosure address one or more of the issues described above by providing embodiments of craft and related equipment that allow safe, accountable, and retrievable operation, and that can be positioned or equipped with specialized features that expand functionality, among other aspects. In addition, embodiments described herein also address concerns which give rise to current and potentially future restrictions by the FAA or other governmental entities on unmanned aircraft.

SUMMARY

This application describes systems, methods, and devices to enhance the safety and functionality of unmanned rotorcraft by improving reliability, transparency, operational capabilities, and effectiveness. Embodiments include integration of rotorcraft with objects attached to the ground (including kites, balloons, or elevated structures) in order to create safe and visible "sky moorings" from which cameras on the craft can operate for extended periods of time while remote control can be used to move and stabilize the camera and/or the kite or balloon to which it is attached.

The rotorcraft and "sky mooring" can either be configured to restrict a moored craft so it remains classified as a structure, "kite," or "balloon" or can include a launch system that allows release of the craft (either with or without a safety line) to perform specific "assignments" from the operator. In embodiments that include the launch-and-retrieval system, the craft can both leave the "sky mooring"

and also return to the "sky mooring," where it can again remain moored while charging, changing payload, undergoing other procedures, and operating its camera(s) until another "dispatch" is directed remotely. The ability to position and provision a variety of kinds of rotorcraft easily in "sky moorings" (either temporarily or permanently)—coupled with the capability to maintain line-of-sight communication with those craft—allows the use of a wide range of special-purpose rotorcraft that can, for example, perform two-way communications with individuals on the ground to evaluate or resolve apparent problems, carry medications or treatment devices to people who may be having a medical crisis, deploy listening or heat-sensing devices to assist with rescue operations or firefighting, photograph or enhance celebrations or ceremonies such as weddings, deploy nets or hooks for fishing when aerial observation or other detection methods suggest fish are present, deliver specialized messages, confetti, or advertising, or be used by law enforcement for interventions to reduce risks to the public from disturbances, unidentified packages, or other sources.

Other embodiments of this disclosure provide a kite that is adapted to be used with a copter. The integrated kite and copter provides several and non-limiting utilities, such as the enjoyment of being able to have a degree of control over the orientation of the integrated unit in the air and the utility of taking photographs over an extended period of time. It also provides a safe introduction or training in copter control for an inexperienced operator with the reduced risk of destruction, loss, or irritation to the public. Another benefit is that the kite adapter/copter integrated unit can be flown on days when there is too much wind to fly a copter, or other craft, untethered. The integrated unit can also include a kite cord that prevents flyaways during training or when wind gusts occur unexpectedly. Moreover, since the copter, when used with the kite adapter, is sustained in the air by the wind, as a typical kite would be, the integrated unit would be subject to fewer governmental restrictions than are imposed on unmanned aircraft. A further embodiment is a mooring line system that can be attached to a quadcopter to protect from flyaways or to position the copter for photographs, including selfies. This so-called "control mooring" system can utilize brackets or platforms that are designed for quick attachment and removal to a variety of popular multicopter configurations.

DESCRIPTION OF THE DRAWINGS

FIG. 4 is a chart containing data for a kite having a particular height and width.

FIG. 5 is a chart containing data for a kite having a particular height and width.

FIG. 6 is a chart containing data for a kite having a particular height and width.

FIG. 7 is a chart containing data for a kite having a particular height and width.

FIG. 32 illustrates a bracket for mooring copters of different size according to an embodiment of this disclosure.

DETAILED DESCRIPTION

The embodiments described herein are intended for illustration and do not limit the scope or spirit of this disclosure. Some of the embodiments described herein employ aspects of objects attached to the ground (including mooring systems, kites, balloons, and elevated structures) in conjunction with modifications to unmanned aircraft to overcome the problems described in the background.

Integration of Unmanned Aircraft with Kites or Balloons

Figure 1:
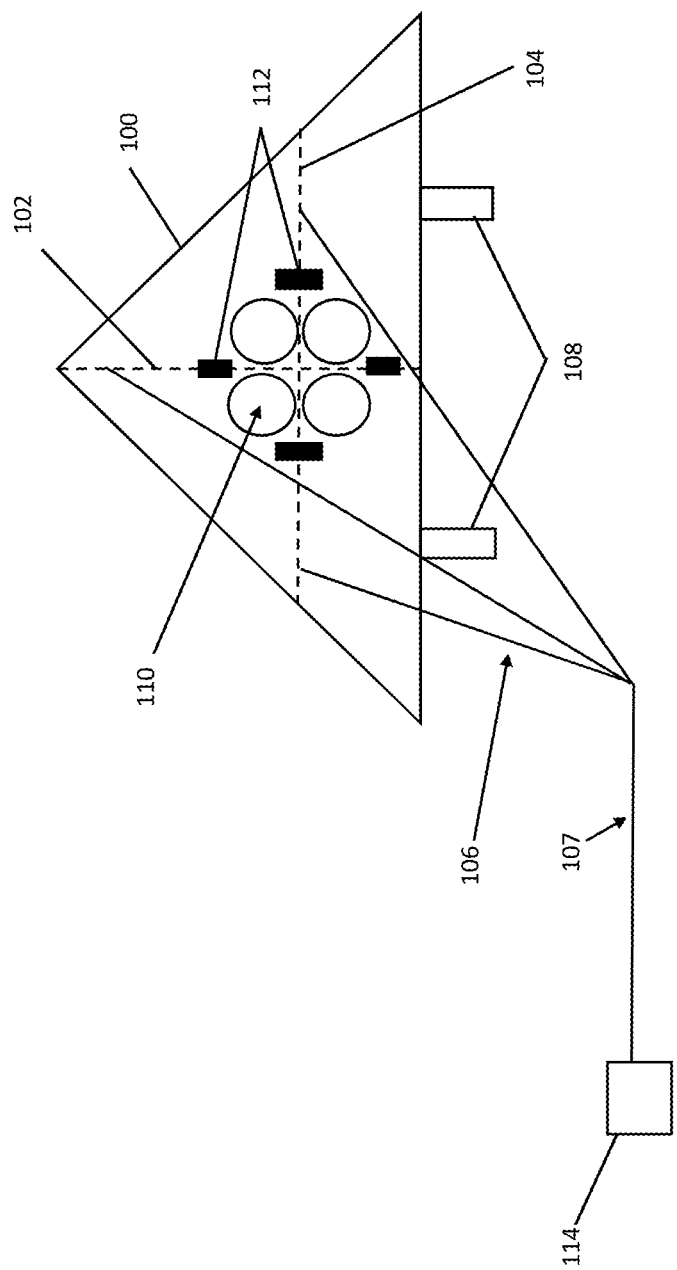
FIG. 1 is a planar view of a kite adapter according to one embodiment of this disclosure.

To begin with a simple example, FIG. 1 illustrates a kite adapter 100 for a copter. The kite adapter 100—which, in this particular embodiment, is a delta-shaped kite—is configured to be coupled to a copter (not shown). Other types of kites can be used for the kite adapter in this disclosure including parafoils, sleds, boxes, winged boxes, diamonds and arrays of several connected kites. The copter can be any rotorcraft including a quadcopter, hexacopter or other multirotor craft. The kite adapter 100 includes a spine 102, a cross spar 104, a bridle and cord 106, and a tail 108. The kite adapter 100 also includes four openings 110 to accommodate each of the four rotors of the copter, and brackets 112 to secure the copter in place.

The cord 107 can be a typical kite cord made of rope or a cable that can be tethered or otherwise connected to a controller 114 used by an operator to control the rotors of the copter. After the copter is secured to the kite adapter 100, the kite adapter/copter integrated unit (referred to at times herein as the "integrated unit") can be operated as a kite, with its orientation and movements being manipulated by controlling the rotors of the copter. As long as the copter is secured to the kite adapter 100, the integrated unit in this embodiment should still fall under the FAA's definition of a kite because the integrated unit illustrated is not designed to fly based on lift from the copter. In other words, in the absence of wind, the kite adapter/copter integrated unit is not capable of flight. Thus, as with a standard kite, the kite adapter/copter integrated unit must be supported in the air by the force of wind moving over its surfaces. This design feature can be achieved by constructing the kite adapter 100 having a weight that prevents the copter, when coupled to the kite adapter 100, from causing the integrated unit to fly in the absence of air moving over its surfaces from sources such as wind, being towed behind a moving vehicle, or being pulled by a running child holding the string. In such an embodiment, the copter, due to the phenomenon of ground effect, may achieve some minor lift causing the integrated unit to slide across the ground. But this lift is insufficient for flight. Other than the weight of the kite adapter 100, a person of ordinary skill would understand that the copter can also be modified so that it does not provide lift sufficient for sustained flight. For example, the power delivered to the rotors can be reduced such that it cannot provide lift to the integrated unit. Optionally, the controller 114 could be configured to be in a "kite mode," where reduced power is applied to the rotors when the copter is installed on the kite adapter 100. Other known modifications to prevent the copter from sustaining the integrated unit in the air can also be implemented without departing from the spirit of this disclosure.

Though the integrated unit achieves flight by air moving over the kite adapter 100, an operator using the controller 114 can control the copter, which in turn can affect the orientation and movement of the kite adapter 100 in the air. This serves several utilities, including the enjoyment of being able to have a degree of control over the orientation of the integrated unit in the air, such as causing the kite to do "loops" or aiming a camera on the copter for aerial photograph or videos. It also provides a safe introduction or training in copter control for an inexperienced operator with the reduced risk of destruction, loss, or irritation to the public. Another benefit is that the kite adapter/copter integrated unit can be flown on days when there is too much wind to fly a copter, or other craft, untethered. The integrated unit, with the cord 107 protects against flyaways during training or when wind gusts occur unexpectedly. If wind is sufficient to maintain flight of the integrated unit without operation of the copter's rotors, the battery life of the copter is greatly extended, allowing a camera on the copter to be used for a longer period of time than if the battery had to provide both lift and power to the camera. Moreover, since the copter, when used with the kite adapter, is sustained in the air by the wind, as a typical kite would be, the integrated unit would be subject to fewer FAA restrictions than are imposed on unmanned aircraft. If the cord 107 gets cut or the integrated unit otherwise becomes untethered to the controller 114, the integrated unit will descend to the ground as a kite would. Moreover, the rotors of the copter, while not being able to provide lift to the integrated unit, would assist in a softer landing, thus preserving both the kite adapter 100 and the copter.

Another important benefit is that since the integrated unit is tethered to the operator's location via the cord 107, the integrated unit cannot be used by an operator to invade the privacy of others clandestinely. This is in contrast to a typical "drone" with a camera, where unwanted pictures or video can be taken while the operator is remotely located. As with a typical kite, the integrated unit is tethered via the cord 107.

Figure 8:
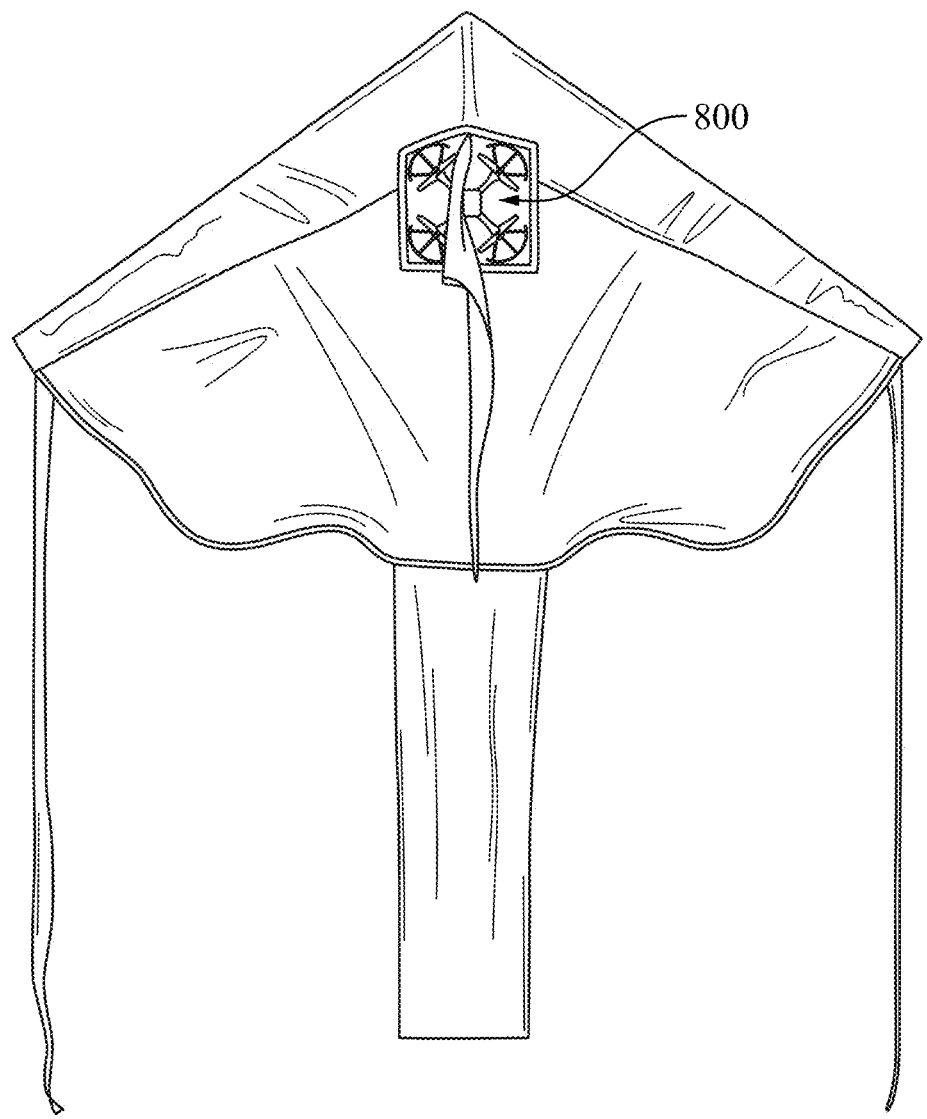
FIG. 8 is a planar view of a kite adapter according to an embodiment of this disclosure.
Figure 9:
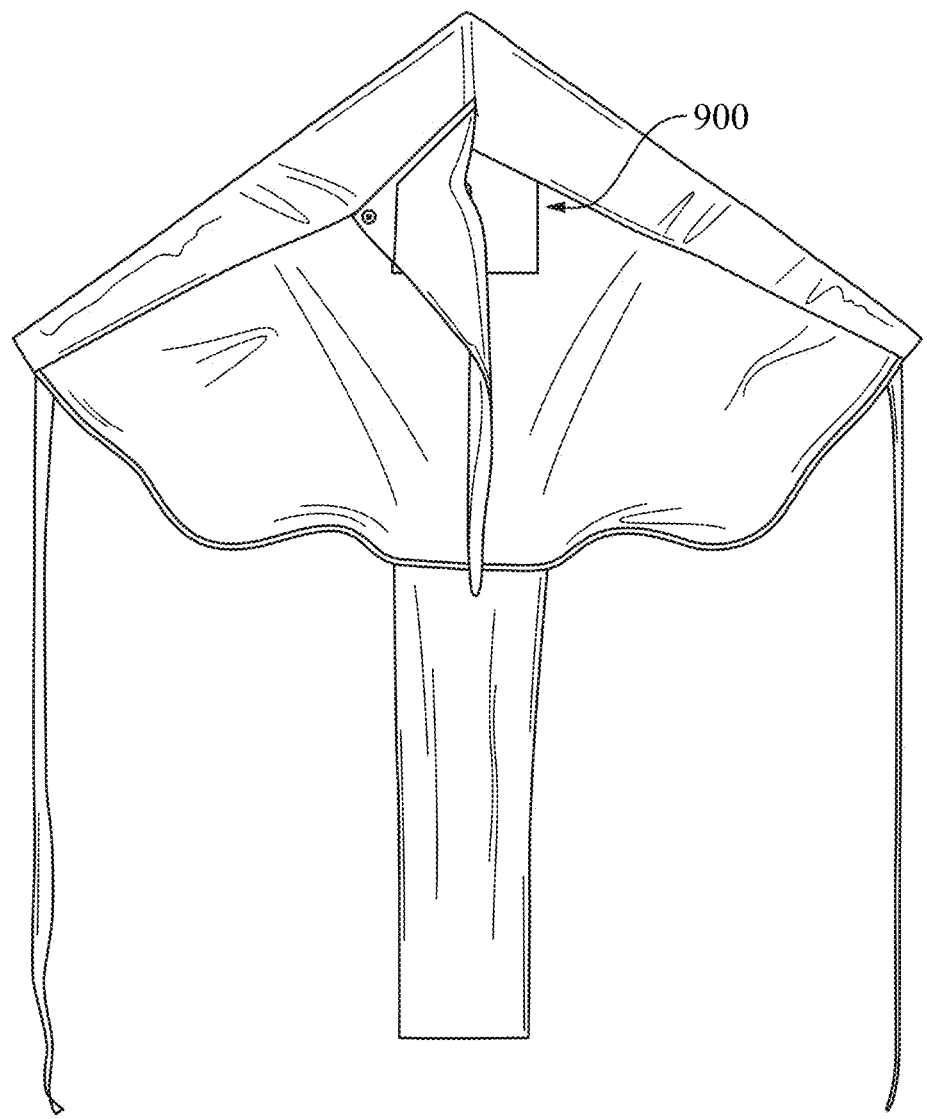
FIG. 9 is a planar view of a kite adapter according to an embodiment of this disclosure.
Figure 20:
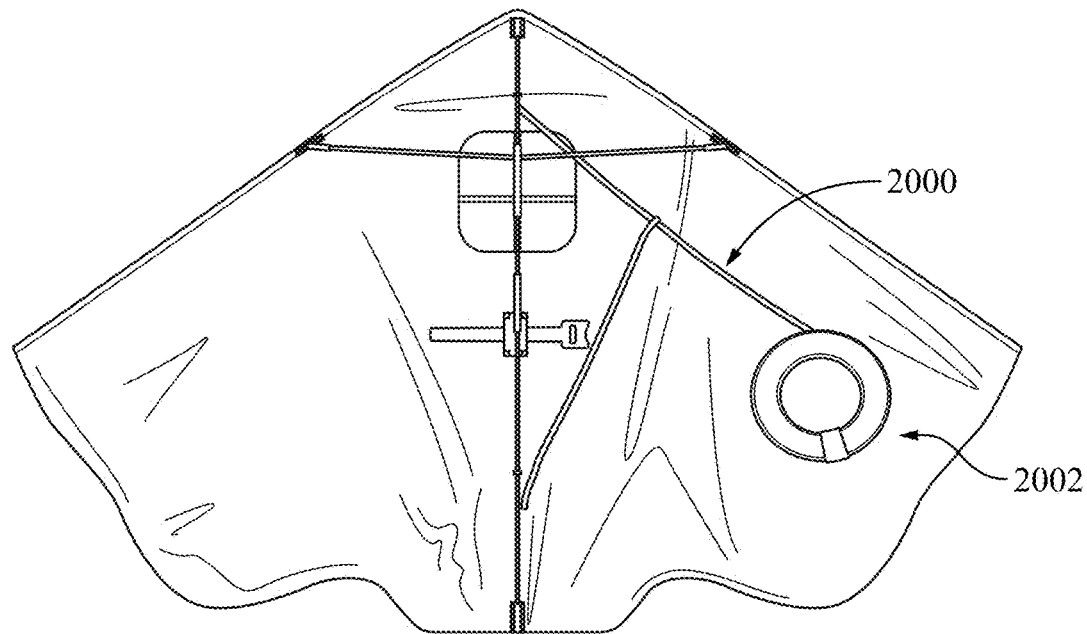
FIG. 20 is a drawing of a kite with a single hole to allow airflow to the rotors of a mounted quadcopter, a mount for a quadcopter on the kite, a platform to attach a mooring line to the bottom of the quadcopter, a line holder, a swivel, etc., according to an embodiment of this disclosure.
Figure 22:
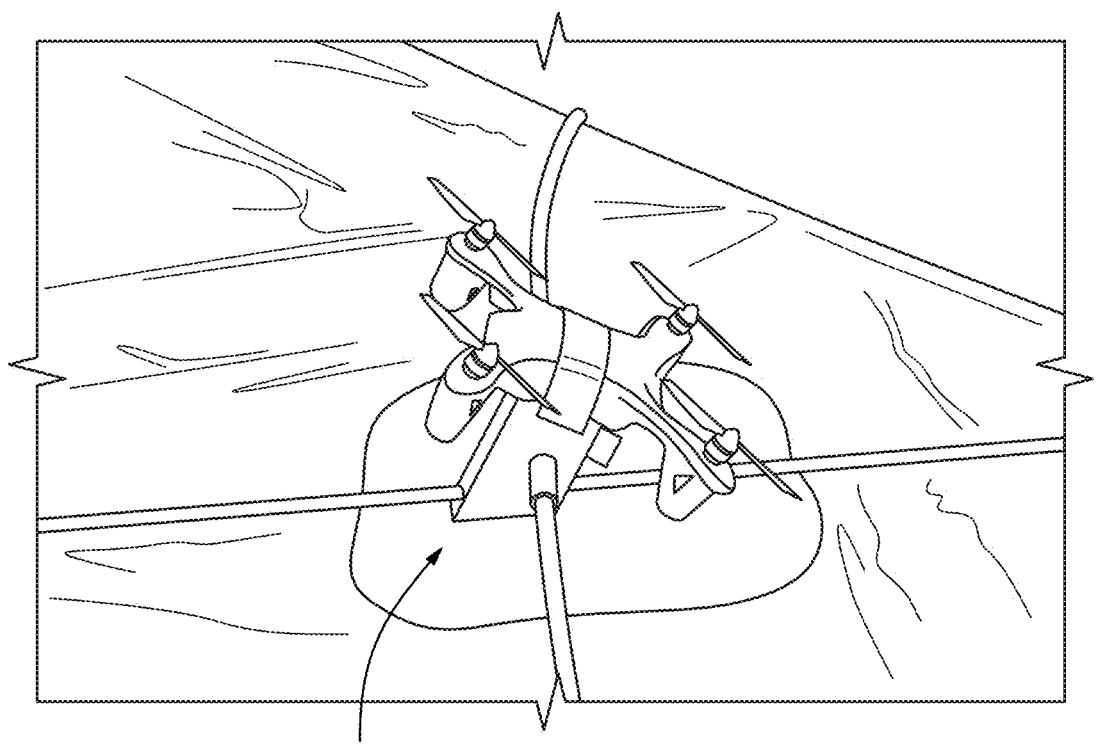
FIG. 22 is a drawing of a quadcopter mounted on the back of a kite, according to an embodiment of this disclosure.
Figure 23:
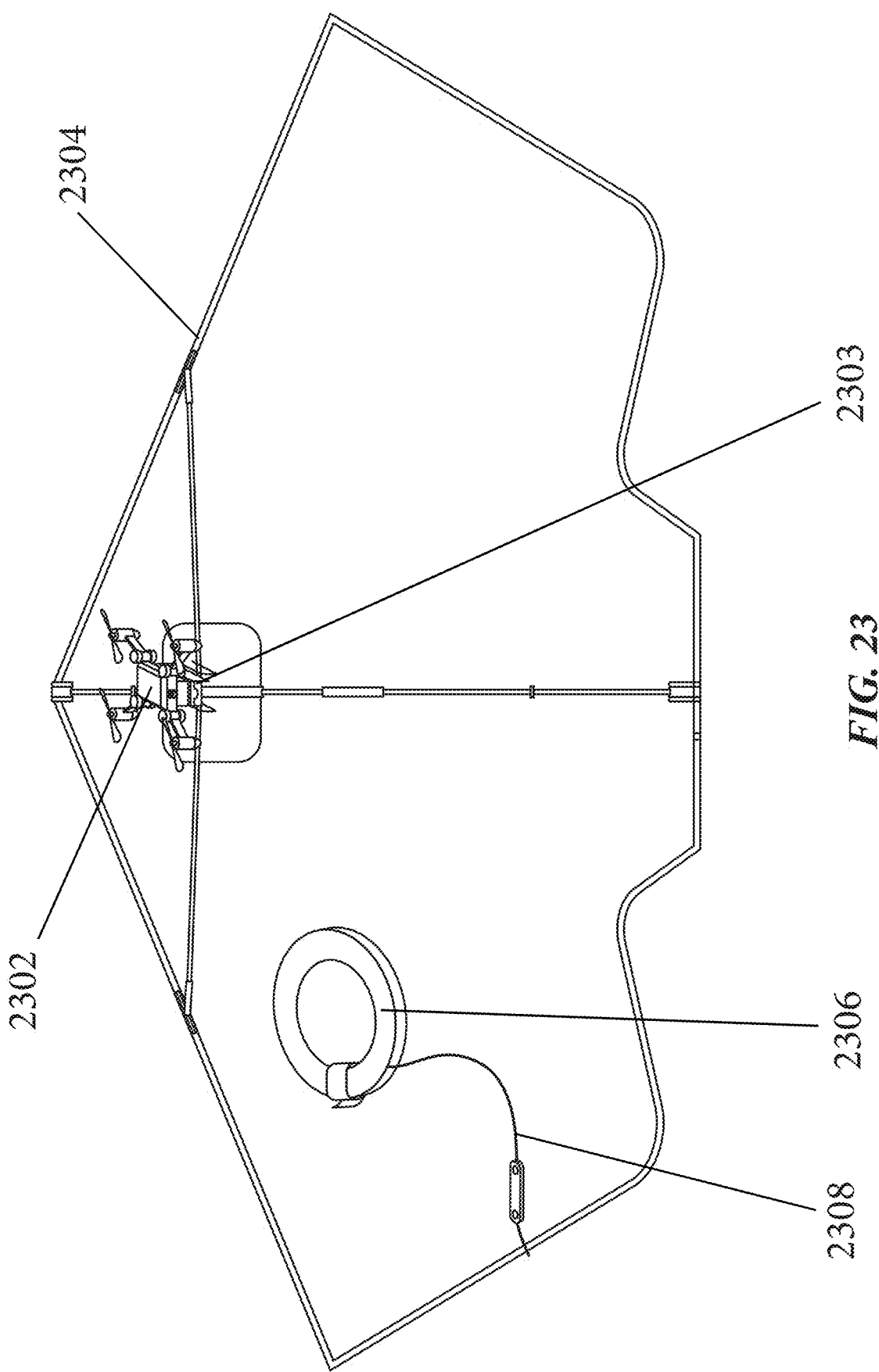
FIG. 23 is a drawing of a quadcopter mounted on the back of a kite, according to an embodiment of this disclosure.
Figure 24:
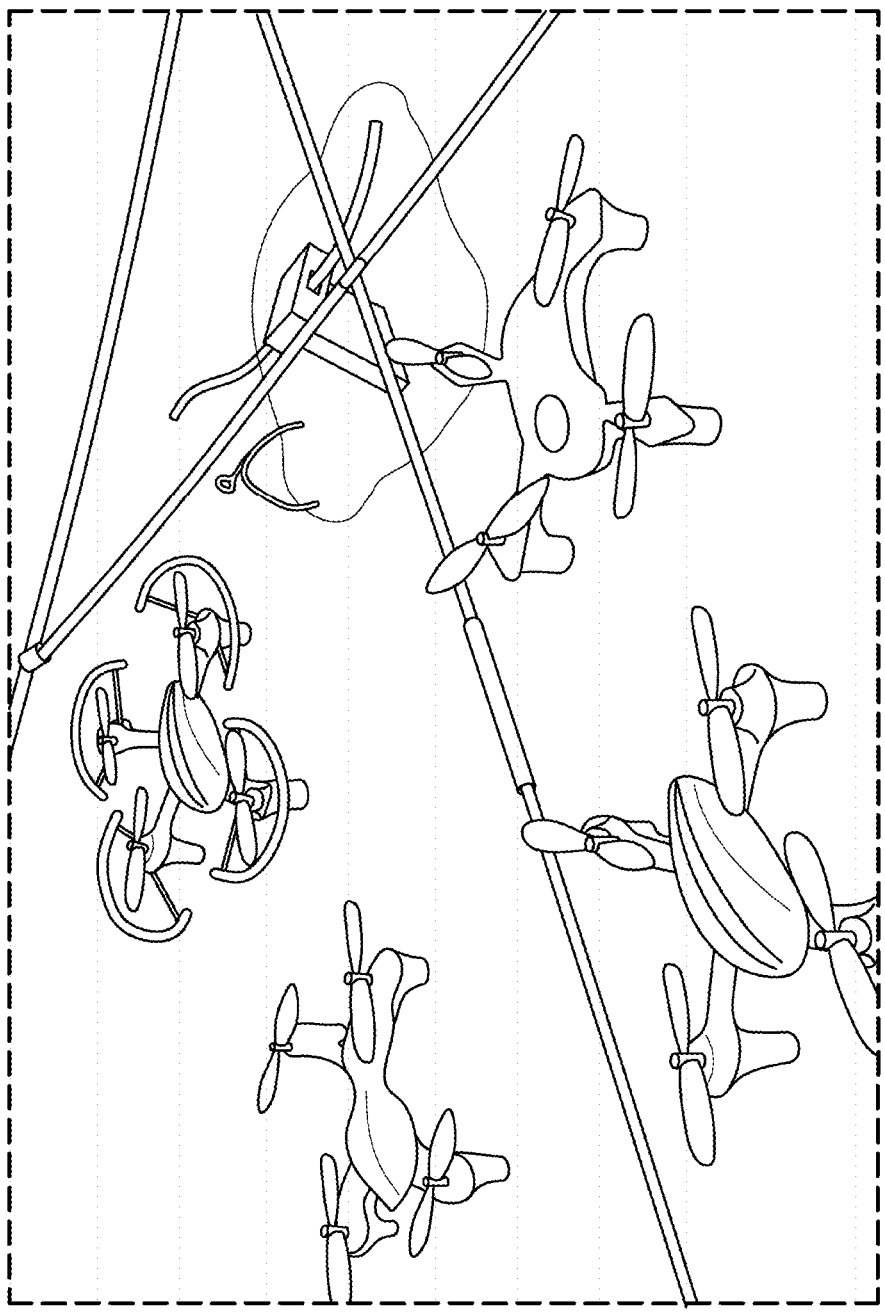
FIG. 24 is a drawing of a kite and mount with several different quadcopter models that fit on the same mount, according to an embodiment of this disclosure.

A person of ordinary skill will appreciate that the benefits of the kite adapter described in the preceding paragraphs would apply more broadly to this disclosure including other embodiments of kite adapters described herein. Moreover, in some embodiments, use of the kite adapter described herein can be thought of as a kit purchased by a consumer that includes the kite adapter customized to a particular type of copter, including brackets for mounting the copter and a cord. For production simplicity, one larger hole can be used rather than a series of holes in the kite fabric, and if the kite is made from a single piece of fabric and a string bridle is used, as shown in FIG. 20, the cost of manufacturing the kite component in the delta-kite format can be significantly reduced. This mounting can be designed with an angle so a camera in the copter can capture video or photographs of the ground looking along the center rod. See FIG. 22, illustrating an angled mount 2200. FIG. 23 illustrates an embodiment showing an angled quadcopter utilizing an angled mount secured to a kite adapter. Specifically, FIG. 23 shows a quadcopter 2302, mounted to a kite adapter 2304, via an angled mount 2303. Also shown is a circular handle 2306 and line 2308, the operator can easily hold with a controller as will be described in more detail herein. In an embodiment, the angle can also be chosen by the user if two or more holes are provided that allow the center rod in the kite to set the mount to a "flat" position that maximizes control or an "angled" position that improves the field of view of a camera on the bottom of the copter, depending upon which hole is used. Mounting systems have been designed and tested that use multiple holes in a saddle to accommodate different quadcopter fuselages, but use of a hook-and-loop fastener as illustrated is a low cost and simple embodiment that can accommodate multiple copter designs with a single product, as illustrated in FIG. 22 with a Hubsan X4 minicopter (Model H107 D+FPV). The mount illustrated is designed so it can also be used with other popular minicopters, such as the Holy Stone "Predator" minicopter (Model HS170), the original Hubsan X4 without a camera (Model H107L), and the Hubsan X4 with a camera that records video on an SD card (Model H107C). See FIG. 24. In some embodiments, the camera feature may be more useful to the operator than the control capability if, for example, the copter is relatively small in comparison to the kite but its camera can still capture pictures from the kite in flight. If control is not a goal, a small copter with a camera could be mounted on the cross bar and center rod of a kite that does not have any holes in the fabric (or in some other position on the kite). This embodiment would further reduce the cost of the system and allow its use in very low wind. In another example, a mini-copter (such as the popular Holy Stone™ "Predator" model) can be mounted on the back of a so-called "easy flyer" delta kite (such as several of the best-selling 40" to 48" wide "rainbow kites" sold on Amazon.com) at the point where the two rods in the kite's frame cross to provide control. The copter and kite can be designed so each can be used individually by removing the copter and by covering one or more holes in the kite with a piece of material attached to the front of the kite with hook-and-loop fasteners (illustrated in FIG. 8 (kite adaptor with an opening 800 for the copter exposed) and FIG. 9 (kite adaptor with the opening 800 for the copter covered, as indicated by reference 900) The length of the tail of the kite may also require adjustment when it is converted from use with the copter to stand-alone flight. To make mounting and removal of the copter easy for consumers, hook-and-loop fasteners, releasable cable ties, or a custom-designed locking "box" can be mounted on the cross bars of the kite to hold the copter.

Figure 10:
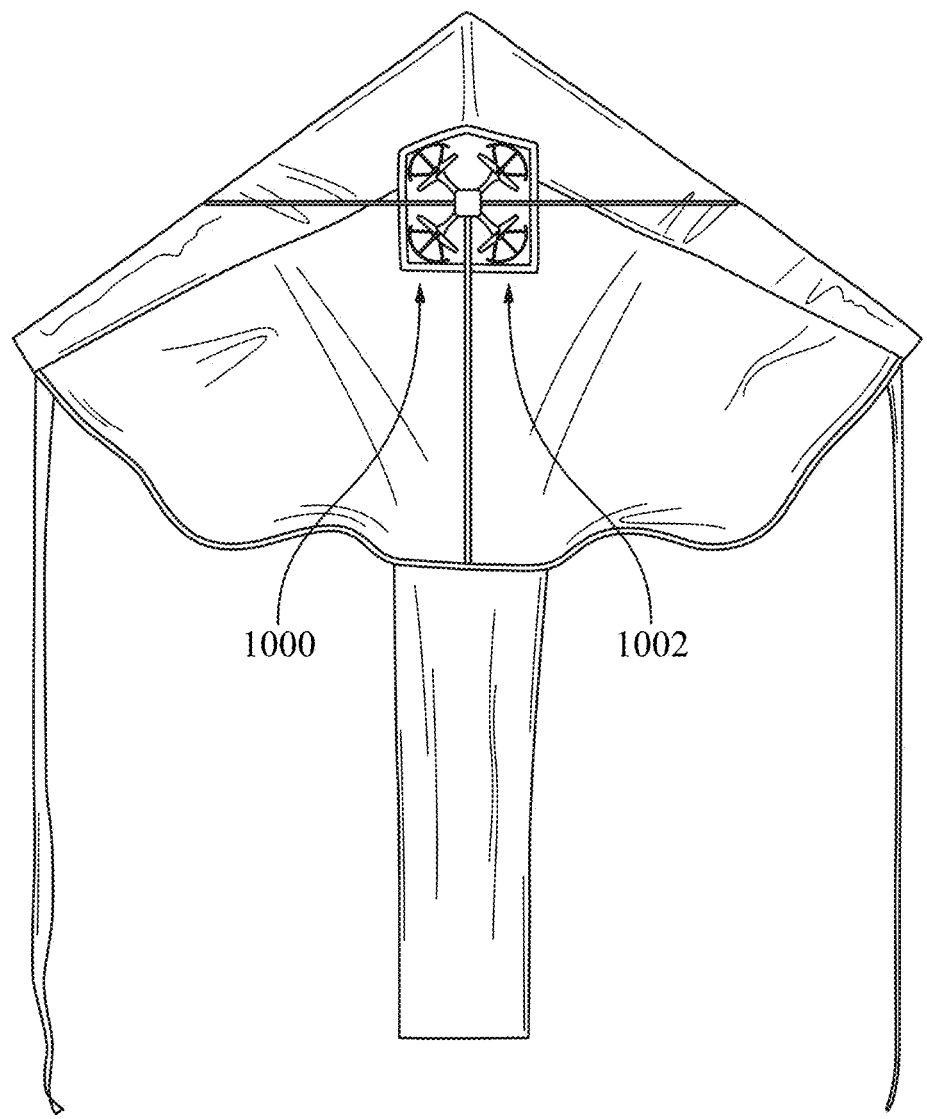
FIG. 10 is a planar view of a kite adapter with a mounted copter according to an embodiment of this disclosure.

When the copter is positioned with its front rotors oriented toward the bottom of the kite (as shown for example by reference 1000 and 1002 in FIG. 10), movement during flight on a standard U.S. mode RC controller of the right stick of the controller to the lower right and the left stick of the controller to the upper left can produce maximum torque to turn the top of the combined unit clockwise (i.e., to the operator's right), producing a movement to the right, or, in certain wind conditions and configurations, causing a dive or loop to the right. Reversing these positions on the controller can produce opposite torque. For ease of reference by users, a template or labels can be provided with the kite adapter kit to place on the controller showing the position of both sticks of the controller for maximum clockwise and counterclockwise movements. Reducing thrust also causes the kite to drop if the wind is at a moderate level, and that might be indicated on any template or labels that are provided with the adapter kit. The kite adapter could also include a controller that is configured to control the copter at least during takeoff and landing. Alternatively, the copter controller could also be configured with "kite adapter" controls that include takeoff and landing. If a "kite mode" button is added to the controller, moving both sticks to the upper right corners could be programmed in that mode to produce a clockwise movement and moving both sticks to the upper left corners could be programmed in that mode to produce counterclockwise movement of the kite. In this embodiment, response of the kite to movement of the remote control levers would be more intuitive for a new operator. Such kits, especially when configured for toy copters, could be a simple way for an operator to enjoy the copter and kite combination on days where use of the copter by itself would be infeasible, such as on windy or gusty days.

Figure 2:
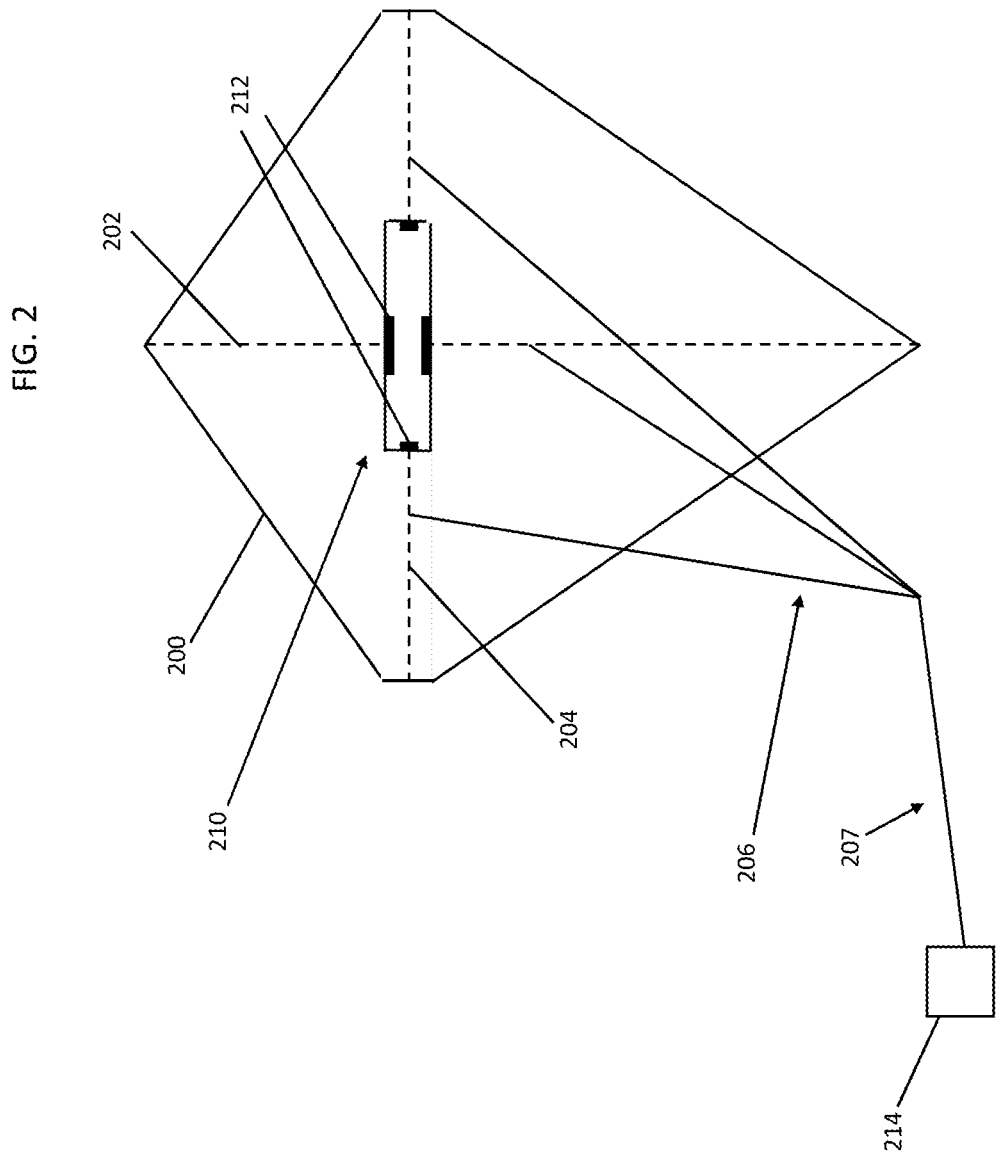
FIG. 2 is a planar view of a kite adapter according to another embodiment of this disclosure.
Figure 11:
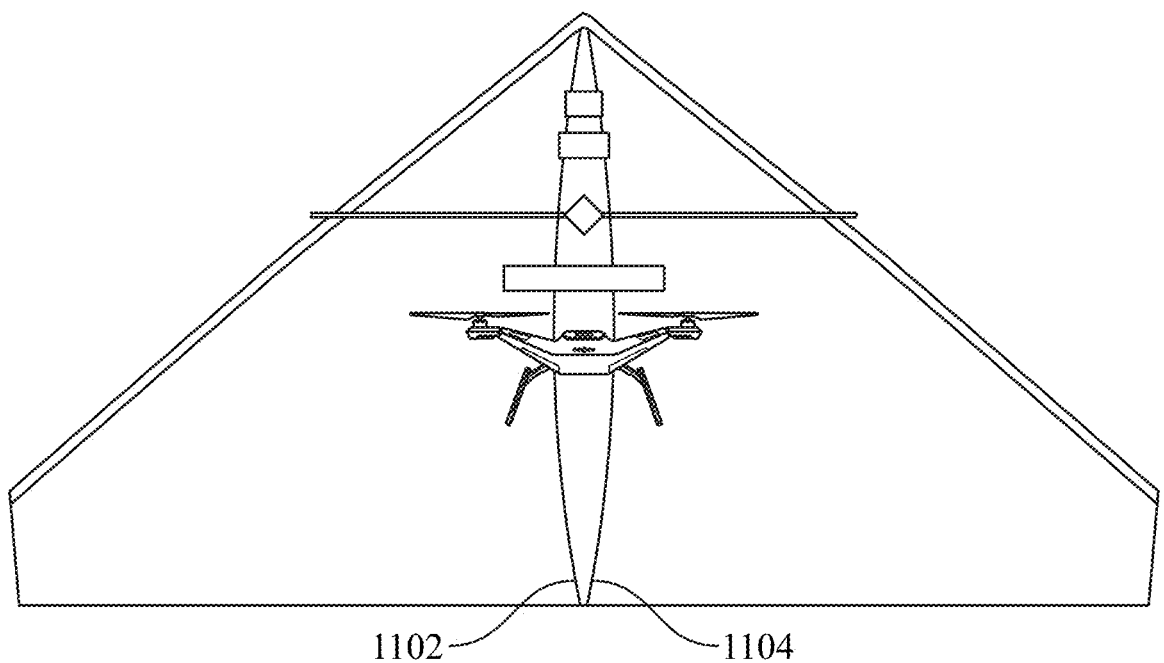
FIG. 11 is a planar view of a kite adapter with a mounted copter according to an embodiment of this disclosure.
Figure 12:
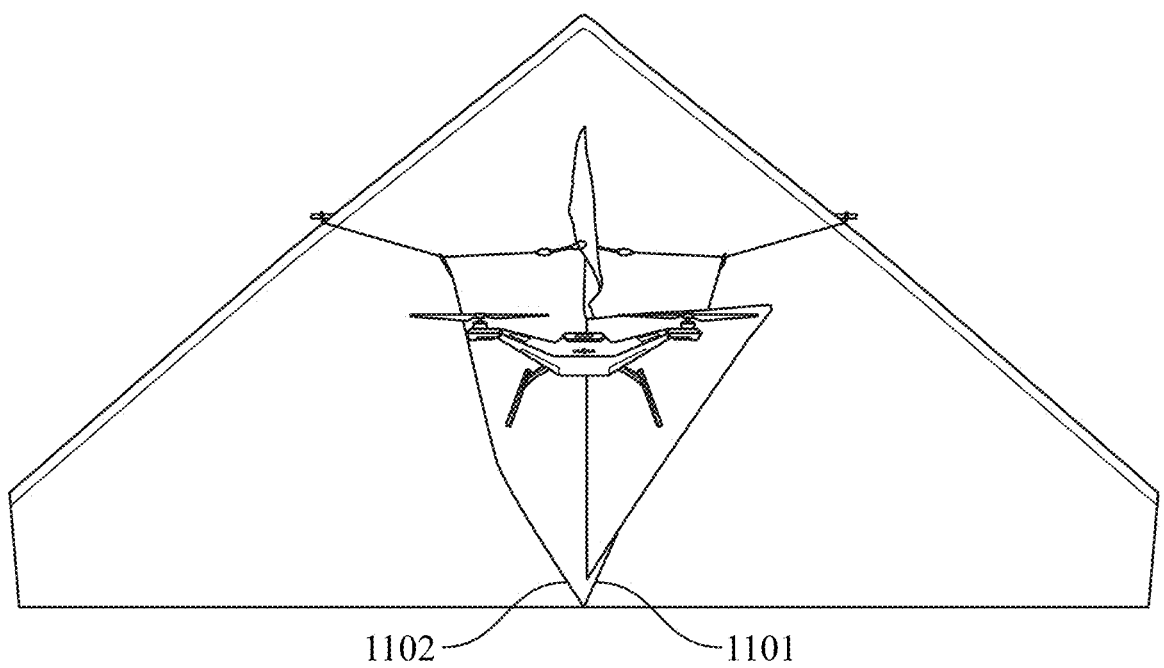
FIG. 12 is a planar view of a kite adapter with a mounted copter according to an embodiment of this disclosure.

Another embodiment of a kite adapter is shown as reference 200 in FIG. 2. In this embodiment, the kite adapter 200 is configured as a diamond-shaped kite and includes a spine 202, a cross spar 204, a bridle and a cord 206. The kite adapter 200 also includes an opening 210 to accommodate a multirotor aircraft such as a copter (not shown), and brackets 212 to secure the copter in place. In this configuration, the copter is mounted such that it is perpendicular to the kite adapter 200. In this way, the copter is in a "gyro position" where the perpendicular relationship between the kite adapter 200 and the copter is like a gyroscope. The "gyro position" can also be used with delta kites, and photography of the area in front of the kite is possible if the standard delta kite bridle is changed. For example, in moderate winds a SkyDog™ 7' Sunrise Delta Kite will lift a standard-size toy quadcopter, such as the UDIRC™ U818, mounted in the "gyro position." This can be achieved by replacing the single vertical rod on the back of the kite with two fiberglass rods 1102, 1104 that are "bowed" to allow the copter to be mounted in the middle between them, as illustrated in FIG. 11. If the camera on the copter is reversed to point toward the rear of the copter (which normally requires only removal of a few screws then turning the camera and replacing the screws), the props can protrude behind the kite while allowing pictures to be taken of the operator and the area in front of the kite during flight, as shown by the copter 1200 with the kite bridle 1202 in FIG. 12; with this mounting, the controls on the copter operate intuitively. Alternatively, the copter can be mounted without modification of the camera position and with the front of the copter protruding on the front side of the kite. Mounting the copter facing the kite operator does not present any issue of control confusion if the copter has a "headless mode" as an ever-increasing number of small copters do. Regardless of the direction the front of the copter faces, the fabric bridle on a delta kite must be removed below the top of the copter to avoid interference with operation of the copter and camera. In an embodiment, for example, the bottom part of the bridle can be replaced in a way that does not block the lens of the camera, as illustrated in FIG. 12. In this embodiment, a "V" shaped cord is connected from the top left of the cross bar to the bottom middle of the kite (and attached firmly to the bottom of the vertical rod) then run back and attached to the top right of the cross bar. Next, a piece of cord is then attached to run horizontally between the "arms" of this "V," generally at the level of the bridle's connection point (and through that connection point). The connection point for the line held by the operator must be attached to both the top of the normal bridle and both sides of the line that is connected to the "V" described above. As is known to persons of ordinary skill in the art, when a kite bridle is matched to a particular kite configuration, adjustments to the tension and connection points on this bridle system will be needed for different kite and copter combinations, but the bridle can be optimized and permanently adjusted during the kite-manufacturing process for specific kites when used with a specified weight range of copters. This adjusted bridle configuration restores stability and control that is lost when the bottom of the fabric bridle is removed and also creates an opening on a delta kite below a copter in gyro position, thereby allowing the camera that is normally mounted on the bottom of such copters to take unobstructed photos or video in the direction of the operator; this mounting also allows the copter to influence the orientation and movement of the kite.

In an alternative embodiment, the copter can be mounted such that it functions as a freely moving gimbal and optionally can have a camera attached to it. The copter can then be used to rotate and aim the camera in any direction, regardless of the position of the kite. If fixed to the body of the kite adapter 200, the copter can be used to control the orientation of the kite even though the copter itself (as also described in connection with kite adapter 100) cannot sustain the kite adapter/copter integrated unit in the air. As noted below, this ability to control the camera orientation can also be implemented as an effective control mechanism for a camera in the "sky mooring" embodiment. Variations of this embodiment, as discussed in more detail below, are to mount the copter below or attached to the bridle in front of kites with other configurations (such as sled kites) so a camera on the bottom or bridle of the copter has fewer restrictions in its view or ability to hover or so movement of the copter can pull on the bridle, fabric, or frame to control movement of the integrated unit.

Figure 13:
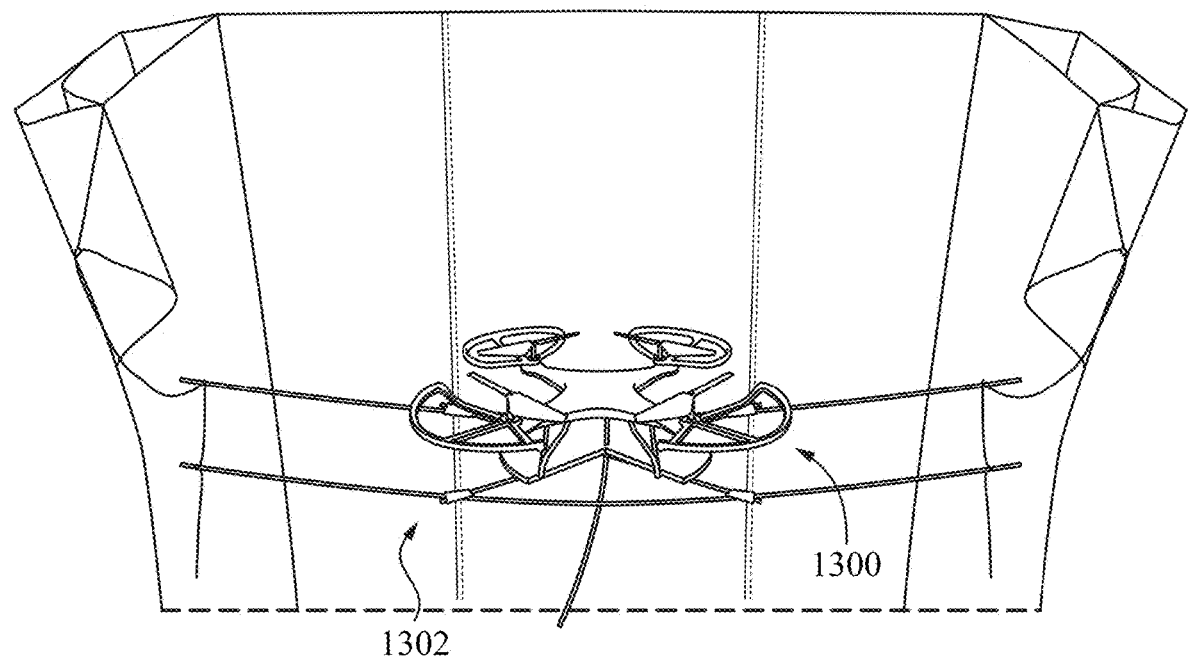
FIG. 13 is a planar view of a kite adapter with a mounted copter according to an embodiment of this disclosure.
Figure 14:
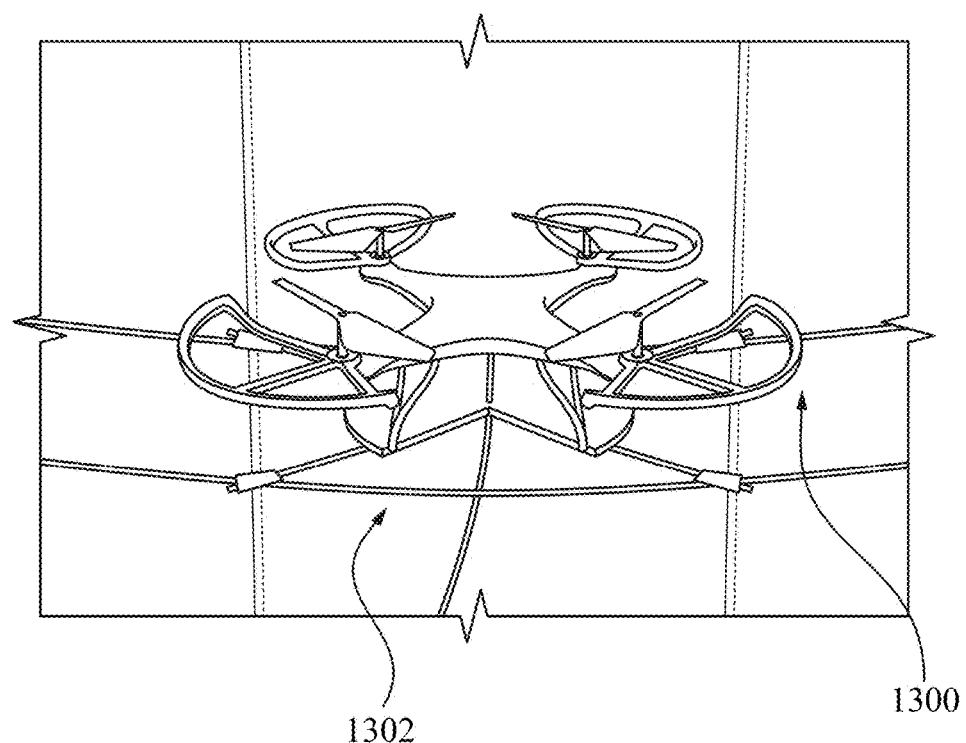
FIG. 14 is a closer view of the kite adapter and mounted copter shown in FIG. 13.
Figure 15:
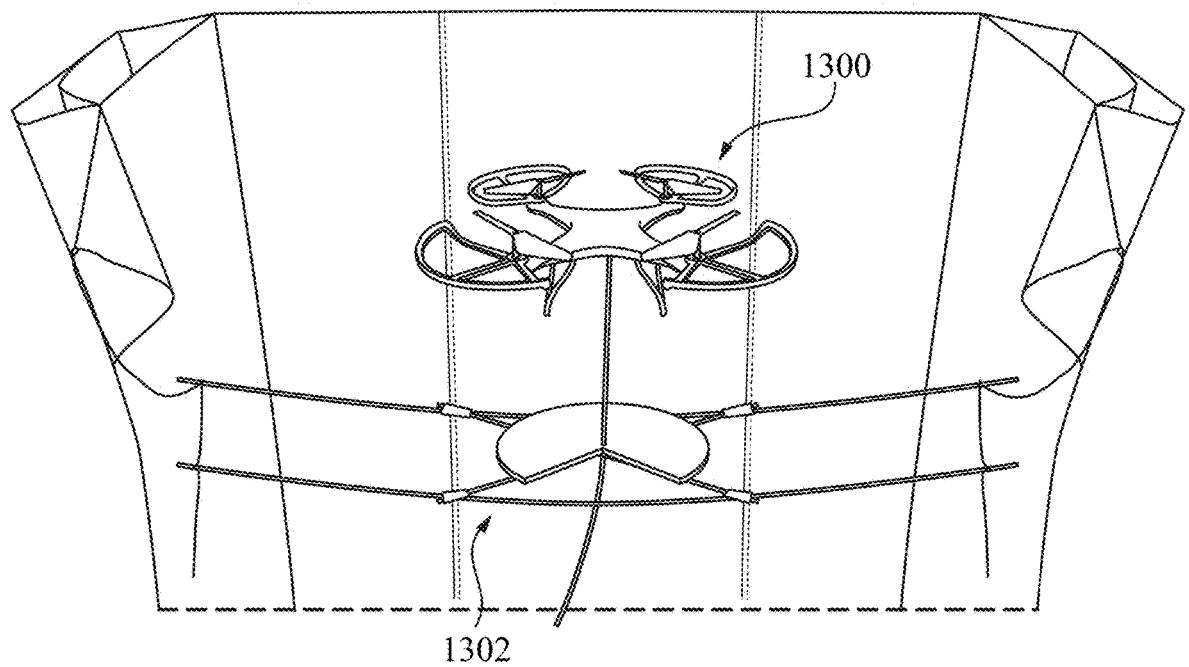
FIG. 15 is a planar view of a kite adapter with a mounted copter according to an embodiment of this disclosure.

For example, a horizontal "landing platform" can be created by attaching several fiberglass rods to the bridle in front of a sled or parafoil kite, and the copter can be connected to this "landing platform" in ways that allow the copter to "fly" for a limited distance while remaining physically connected to the kite or, as discussed below, in ways that allow the copter to be released remotely to fly independently. A simple mechanical connection between the "landing platform" and the copter can be achieved, for example, by connecting one or more carbon fiber or fiberglass rods vertically below the middle of the copter (such as by attachment to the landing gear with releasable cable ties) and running the rod(s) through a hole or tube in the middle of the "landing platform" so the copter can move up or down a short distance and can turn or tilt to point the camera, as illustrated in FIGS. 13, 14 and 15. FIG. 13 shows a kite adapter with a copter 1300 positioned on an example of a "landing platform" illustrated by reference 1302 FIG. 14 shows a closer view of the kite adapter and copter shown in FIG. 13. FIG. 15 shows the kite adapter with the copter still tethered to the adapter, but capable of limited "flight." The flexibility of these rods can be varied as desired by using different diameters. If the copter transmits continuous pictures (as an increasing number of copters do by using a wifi connection with a smart phone application or a 5.8 ghz video transmitter and as do action cameras with wifi capability), the operator can frame shots using the live view and then activate the copter's camera (or an action camera mounted on the copter) remotely (using software that is now commonly provided with such copters and cameras) to take photos or start and stop video.

Figure 16:
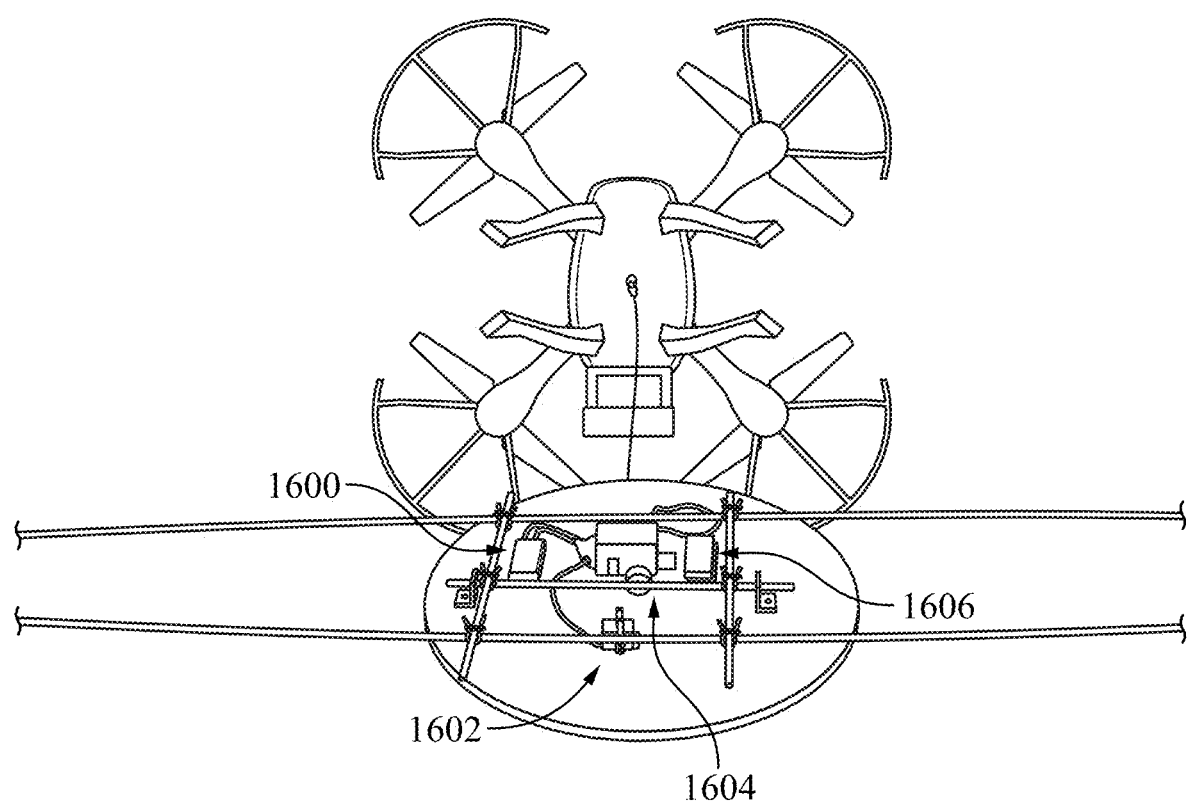
FIG. 16 is a planar view of components of a "landing platform" control system according to an embodiment of this disclosure.
Figure 17:
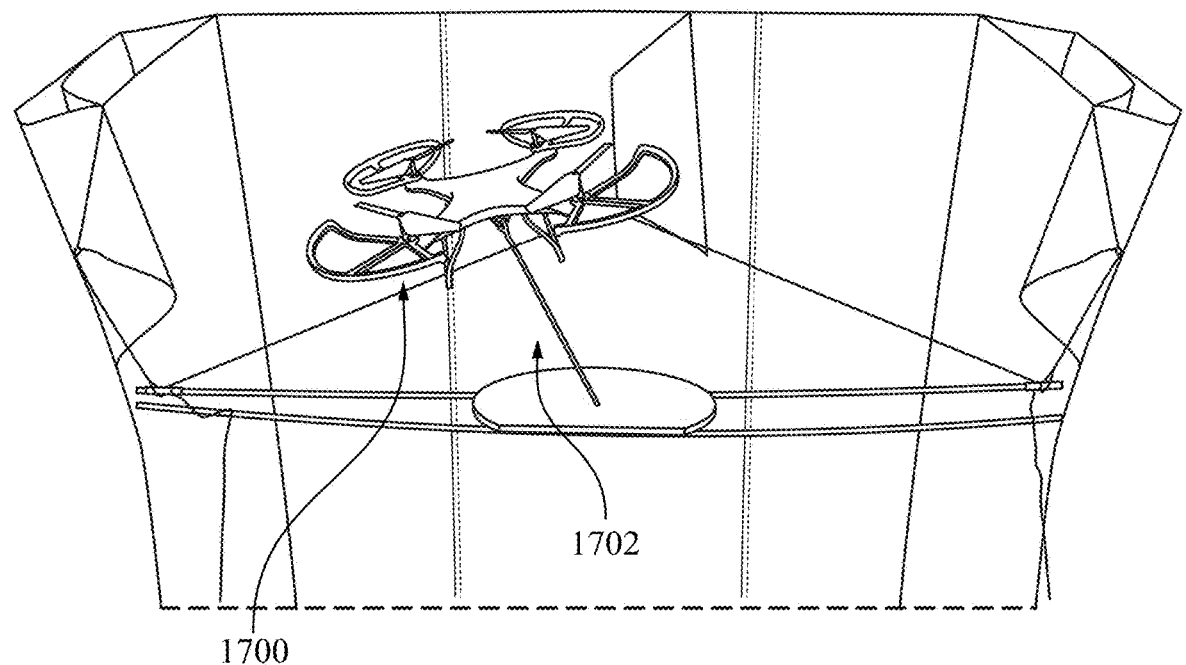
FIG. 17 is a planar view of a kite adapter with a mounted copter according to an embodiment of this disclosure.

Alternatively, connection between the "landing platform" and the copter can be made with a line attached to a pulley or drum on a small 360-degree remotely controlled motor (of a type that is readily available for RC aircraft). An example of components of that include this system is illustrated in FIG. 16, which illustrates components of the RC servo including a battery 1600, a servo to tilt platform up and down 1602, a servo and pulley for mooring line 1604, and an RC receiver 1606. The pulley or drum would be positioned below the "landing platform" with the line going through that platform for attachment to the copter by means of a releasable cable tie (or by passing through an eyelet on the bottom of the copter or on a platform or bracket attached to the copter, as described below in the "control mooring" discussion). The line can then be extended or retracted by rotating the pulley by remote control to allow "flights" of the copter in the immediate vicinity of the kite and then to "reel in" the copter to "land" on the platform again. For example, as shown in FIG. 17, releasing a copter 1700 to hover while connected by a safety line 1702 allows the stability of the camera to be controlled by the copter alone, without vibration or shaking from movements of the kite in the wind.

Figure 18:
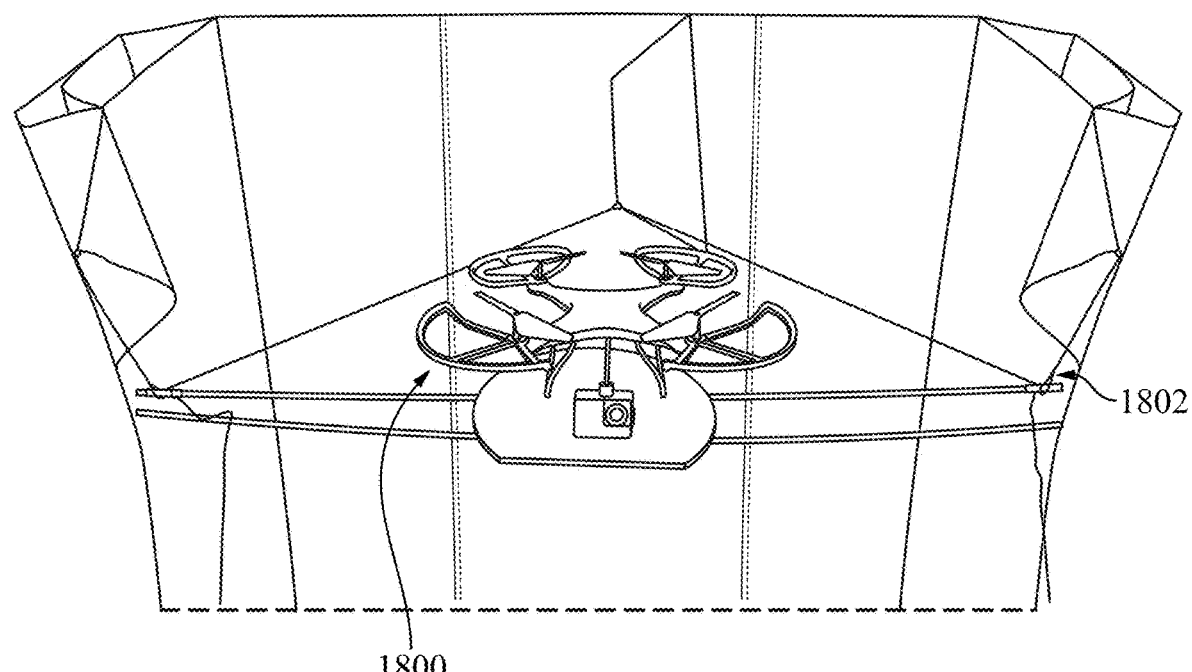
FIG. 18 is a planar view of a kite adapter with a mounted copter according to an embodiment of this disclosure.
Figure 19:
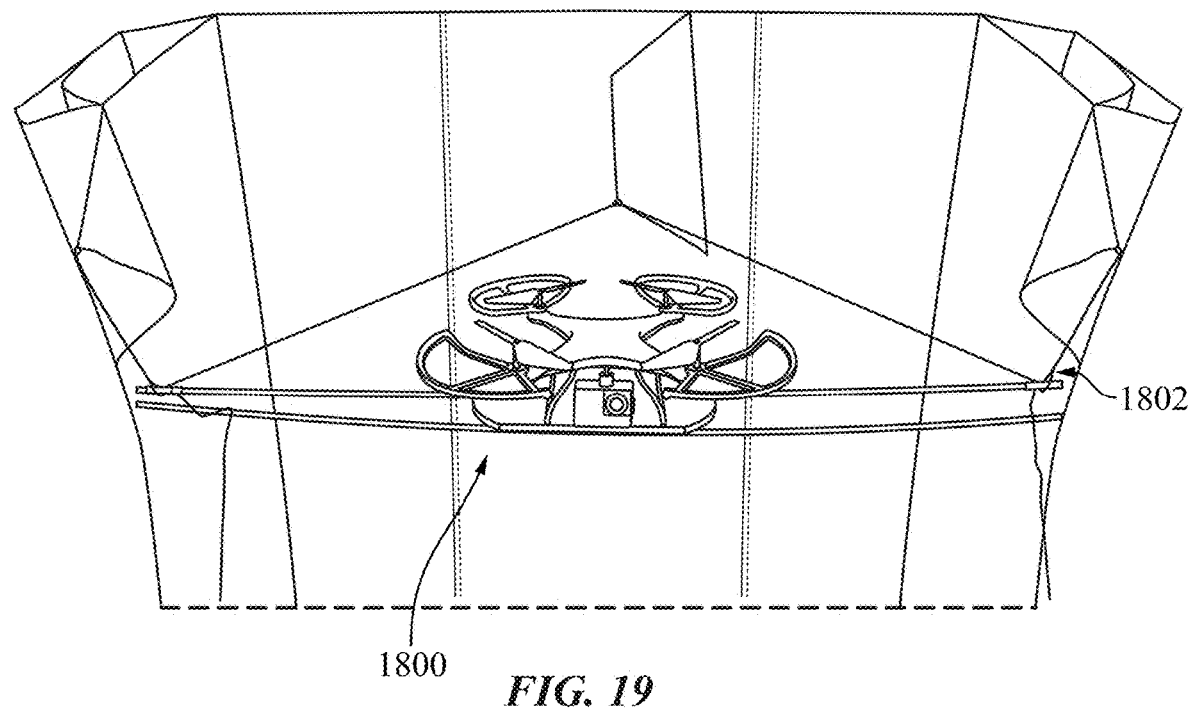
FIG. 19 is a planar view of a kite adapter with a mounted copter according to an embodiment of this disclosure.

As further illustrated in FIGS. 16, 18, and 19, a platform 1800 can be attached to a bridle 1802 with brackets that allow a "rocking motion" for the platform 1800 that is remotely controlled by a standard RC servo via a second channel in the radio system. With this feature, the copter can be tilted up and down to frame shots in the "landed position" on the platform, as illustrated in FIG. 18 (copter tilted downward) and FIG. 19 (copter tilted upward). The copter can also be rotated in the "landed position" by application of limited lift and by moving the left stick to point the nose of the copter to the left or right. Achieving and holding the "landed position" can be accomplished by retrieving the line until it holds the copter firmly against the platform. The ability to hold the copter in the "landed position" allows the copter's camera to "watch" a scene from an aerial position for extended periods supported by the kite, with power usage limited to the camera system and RC receiver; for better video shooting, the copter can then be "released" by feeding out line and can hover to frame shots without interference from the kite or bridle while using the copter's gyro systems to stabilize video.

A further benefit of these mounting embodiments while the copter remains in the "landed position" (or otherwise connect to the kite in some way) is that they make it practical to supply supplemental power to the copter (and/or the camera on the copter) through a wire or wires attached to a battery and/or solar panels on the kite. In order for a power cord to be used from the kite to the copter and/or camera with this mounting, a mechanical restriction on the ability of the rod or rods to rotate is helpful to prevent the power line from wrapping around the vertical rod or rods if the copter is rotated more than 360 degrees while hovering. This can be accomplished by making the rod "D" shaped (or by using two rods side by side) and passing the rod(s) through a small plate or disk on the top of the "landing platform" with a "D" shape or two matching holes for the two-rod system; protrusions can then contact a stop that prevents the plate or disk from rotating more than 360 degrees (and thus prevents the rod(s) and copter from rotating enough to tangle the power cord). Also, in another variation of this embodiment, if the line passes through a loop on the bottom of the copter with one end that is not connected to the pulley or drum and if the loose end is then passed back through the hole in the platform and wound on the pulley with the secured portion of the line, the copter can hover and still be retrieved as long as the free end remains "caught" by remaining line wound on the pulley, but the copter can also be released to fly independently by extending the line fully while adding thrust to lift the copter; the free end of the line then pulls away from the pulley and through the loop (thus releasing the copter), and the pulley or drum would retrieve the mooring line while the copter performs a "assignment" (such as taking pictures of a specific event or delivering rescue equipment) and then lands in another location. If the copter is connected in a way that allows it to apply thrust and fly independently, power sources on the kite can still be connected to the copter or camera while it is close to the kite if the wires have sliding connectors (such as USB plugs or common RC battery charging connectors) that can pull loose when the thrust is applied and line is fed out to release the copter for independent flight.

The components of the "landing platform" systems described above are part of the bridle for a sled or parafoil kite and do not normally require modification of the sled or parafoil kite itself, allowing that kite to be used normally if the normal kite-only bridle is used. For this reason, a bridle of the type described above with the "landing platform" could be attached to the kite itself with standard snap swivels for easy connection and removal. A person of ordinary skill in kite making would recognize that these and other adjustments can tailor the mounting system and kite structure to be more effective with specific copters for particular uses. For example, to improve performance from certain copter-kite units over a greater range of wind speeds, slits or flaps can be placed in the kite fabric with mechanisms (such as zippers or Velcro™) to close or open them as needed, and one or more tails of various materials, lengths, weights, and shapes can be added to increase stability of the integrated unit. Balloons can also be used in lieu of or in combination with the kite to provide lift for the mounting systems described above. Using larger sled or parafoil kites (and/or balloons) and more sophisticated mounting systems, including those discussed further below, embodiments of these mounting systems can also accommodate professional-grade multi-copters such as those from DJI™ or Yuneec™.

Figure 25:
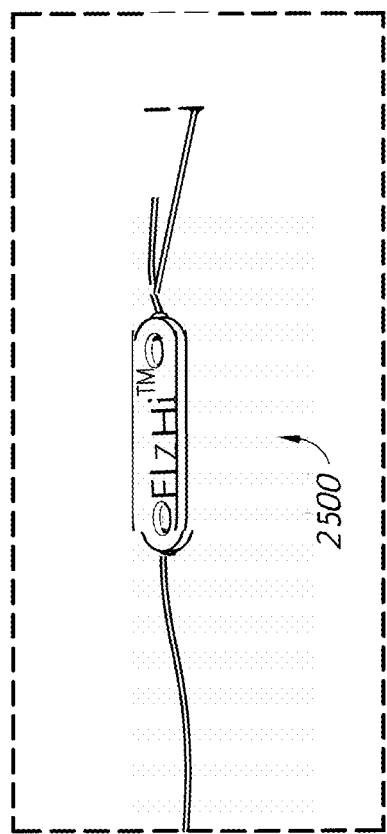
FIG. 25 is a drawing showing a "tangle block" that operates as explained in the text, according to an embodiment of this disclosure.

In the embodiments shown in FIGS. 1 and 2, one potential issue is that the bridle or cord can get caught in the rotor blades of the copter. To avoid this, the kite adapter described herein can include a mesh material or other netting that is configured to surround the rotors such that neither the kite adapter material, bridle, cord, tail, nor other part can get caught in the rotor blades. The mesh could be made from fabric or a sturdier material such as plastic. Not only would the mesh isolate the rotor blades, it would also provide additional wind resistance to support the kite adapter/copter integrated unit in the air. The mesh could be a sphere that opens at its diameter and clasps over the rotor. In this embodiment the sphere could have the appearance and feel of a "wiffle ball." Other materials and shapes that isolate the rotor blades from the kite adapter can be used and do not depart from the scope of this disclosure. The use of a light-weight, removable enclosure for each rotor (or other barrier such as tubes or coating around the bridle and part of the tether cord) that prevents lines from becoming entangled in the rotors can be an aspect of all embodiments in which a kite, tethered balloon, and/or safety line is used. Use of a 1 to 2 meter length of heavy line (such as 1000 pound test Kevlar™) has also been found to reduce the issue of line tangling in the rotors by providing weight and resistance to tangling that keeps the line near the copter from blowing into the rotors and rarely, if ever, winds around rotors or their shafts. In another embodiment, a lower-cost alternative for production purposes to reduce line tangling is attachment of a small weight 2500 as shown in FIG. 25 that can be positioned on the line between 12 and 48 inches below the attachment point on the kite. For identification of this component in instruction booklets and marketing materials, the term "tangle block" has been coined by the inventors.

Figure 21:
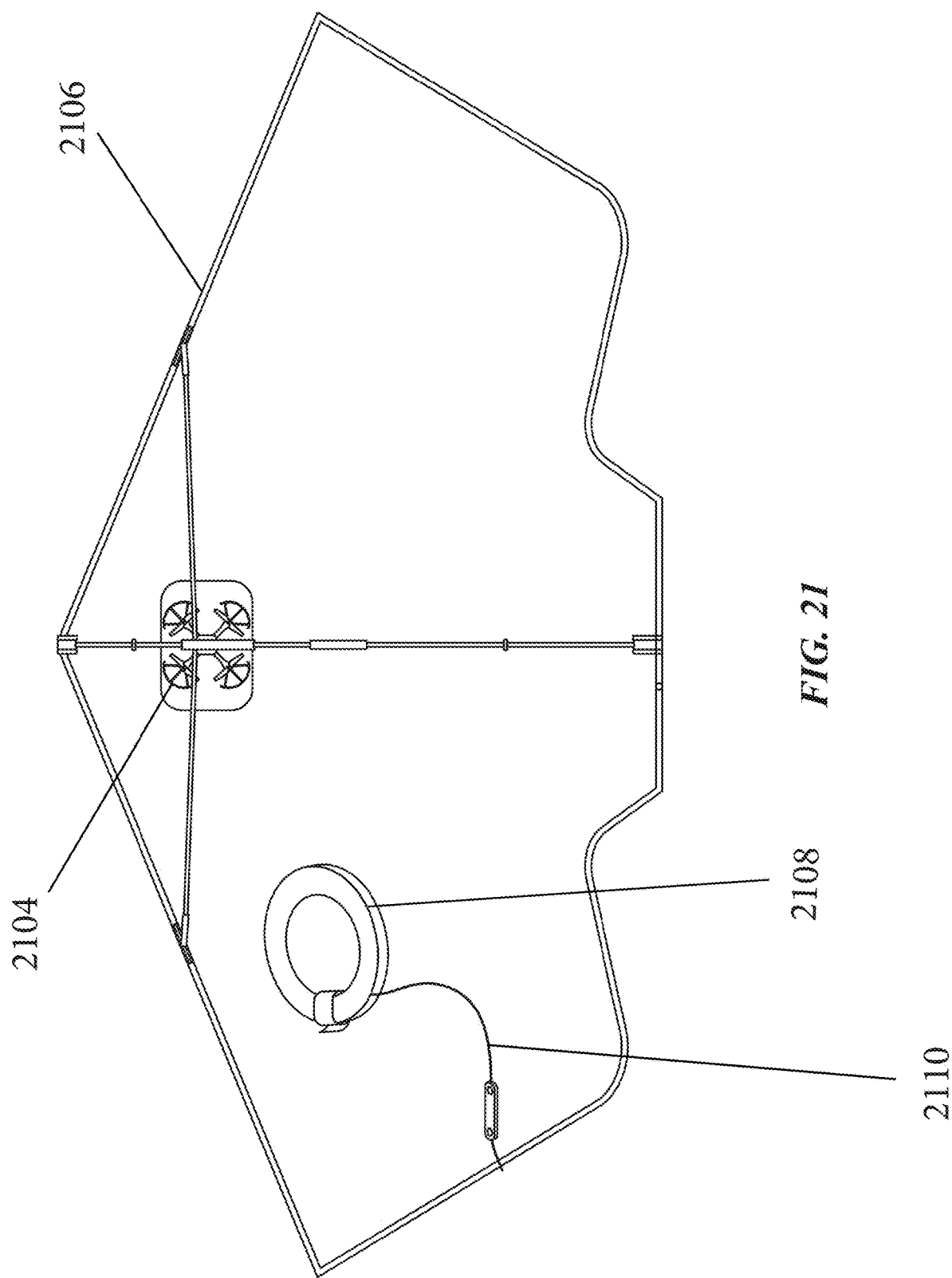
FIG. 21 is a drawing of a kite with a single hole with a quadcopter mounted according to an embodiment of this disclosure.

As shown in FIGS. 1 and 2, the cords 107 and 207 attached to the controller 114 and 214. In another embodiment, using a circular handle 2002 with line 2000 on it that the operator can easily hold with the transmitter, as shown in FIG. 20, is less expensive to produce, and testing has shown that relatively little practice is required for a single operator to release line from such a handle to launch the kite while also operating the transmitter to control the kite's orientation; this system allows a single operator to provide control for both the copter and kite unit. For further illustration, FIG. 21 is drawing showing a quadcopter 2104 mounted to a kite adapter 2106, with a circular handle 2108 and line 2110 attached to the kite adapter 2106.

The system can also be used with one person operating the transmitter and another person launching the kite and controlling the kite line. In an embodiment, the controllers 114 and 214 could include a battery-powered line winder that is designed to attach to the controller. Optionally, the line winder could include controls such that an operator could operate the winder with his or her forefingers of each hand when the controller is held in the usual position for moving the levers with thumbs (i.e., an "up" button on the winder that could be pressed with the right forefinger and a "down" button in easy reach of the left forefinger). The winder, rather than battery-powered, could also be a manual crank winder, or could draw power from an auxiliary plug on the controller or another power source. In embodiments where the winder is powered, a manual crank could still be provided as a safety option if the power fails. The crank might be designed, when not needed, to be folded and pushed into the hollow middle of the shaft around which the line is wrapped so it is not in the way during powered operation. The line release and line retraction operations of the winder could also be integrated with the throttle control of the controller. A variation of this embodiment could use multiple lines and multiple winders, as discussed below.

Optionally, the controller 114 or 214 can be configured with a "takeoff" mode, where all rotors of the copter are activated at full thrust for a period of time while the integrated unit is pulled for launching as an operator would with a typical kite. Activating the rotors would create a supplemental lift at full power to assist the integrated unit in taking flight. The copter could also have a setting that changes the calibration of its gyroscope to adapt to the normal orientation of the kite component or directions for changing the copter's calibration could be included in instructions for an after-market kite adapter. Without this feature (and without performing gyro recalibration to "kite flight position" as described below), some popular multi-copters will attempt to maintain stability in level flight, which can make launch of a kite or balloon more difficult, rather than providing full power, and which can reduce the effectiveness of the copter in controlling the integrated unit during flight. In some configurations, an option to disable any "altitude hold" feature in the copter may also improve maneuverability of the integrated unit. In an embodiment, copter makers could add a "kite mode" button that changes calibration automatically and performs other adjustments for use on kites that make lever operation more intuitive. No copters currently have "kite mode" settings because copters have not been sold for use with kites. Because no copters with a "kite mode setting" exist yet, manual recalibration is needed. Step-by-step recalibration procedures have been described in the instructions for embodiments of "copter kites" the inventors have developed for sale. These procedures do not make any physical change to the copters but do allow temporary recalibration by the consumer of multicopters to "kite flight position" (as described below) after they are mounted for use on a kite. For example, the Holy Stone HS170 shown in FIG. 24 can be easily calibrated if it is attached to the mount and the kite is placed in a position with the bottom about 5 inches back from a wall and with the point leaning against the wall (with the bridle on the same side as the wall). This places the copter in "kite flight position," which is the same orientation that it has while attached to the kite in flight. After binding the copter to the transmitter, the gyro on the model HS170 can be recalibrated to a "kite flight position" orientation by pressing the thrust lever (also called the "throttle" and located on the left in "Mode 2 transmitters" typically sold in the US) down and then by placing both levers in the lower left corner until the lights on the copter flash. When the lights stop flashing and are constant, the levers can be released; the effectiveness of the calibration operation can then be tested by checking to be sure all four rotors operate at equal power when thrust is applied with the copter in "kite flight position." (If this process fails to recalibrate, a troubleshooting procedure as explained in the instructions for the HS170 is to repeat the steps except to place both levers in the bottom right corners.) For the three Hubsan X4 copters shown in FIG. 24, gyro calibration in "kite flight position" is accomplished by holding the thrust lever to the lower right corner and moving the other lever back and forth from left to right until the lights on the front of the copter blink. Similar calibration sequences are available for the gyros on all consumer multicopters. To restore gyro calibration for level flight, the copter is placed on a level surface and the calibration steps are repeated.

"Control Mooring" for Rotorcraft

Figure 30:
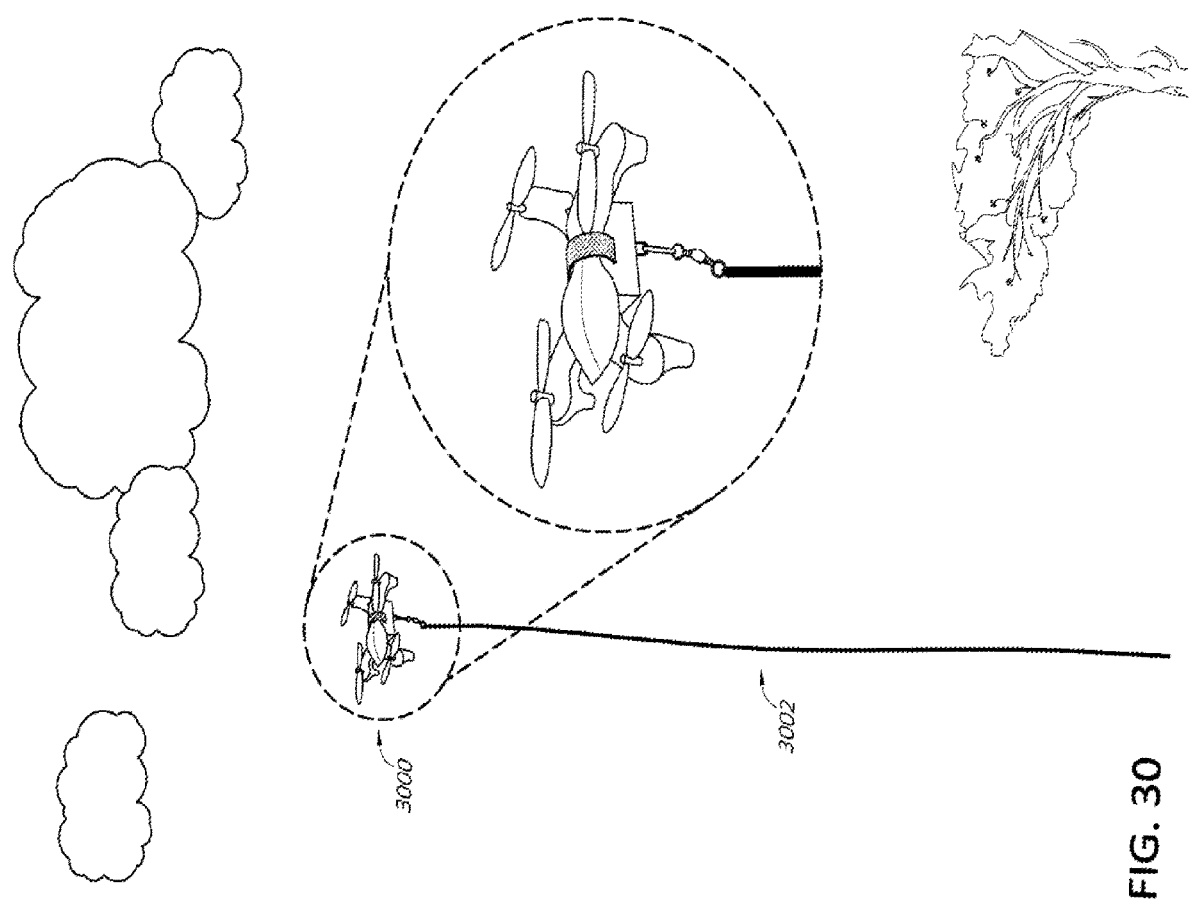
FIG. 30 shows a quadcopter attached to a "control mooring" in flight.

"Control mooring" is a term coined by the inventors to describe a mooring system that provides an efficient and low-cost embodiment with many benefits. That term is currently the subject of a pending trademark application and will be used from time to time for convenience in this application. Embodiments of a "control mooring" system described herein control the maximum altitude and flight radius of the multicopter and can be used to hold the multicopter having a camera in a fixed position for taking photographs, taking selfies, or shooting video. The system also protects against flyaways from wind gusts and can be adjusted to avoid contact with obstacles, such as trees or nearby buildings. In addition, the system allows for flight in confined spaces such as indoors or outdoors in backyards, parks, and other small flying sites, where contact with structures or obstacles needs to be avoided. The "control mooring" system is also helpful whenever a flyaway could create hazards for the multicopter, people, pets, personal property, or the copter itself. For smaller multicopters, these occasions include flights outdoors on any day with more than a light breeze present. For all sizes of multicopters, the "control mooring" system is useful in locations near structures or obstacles that must be avoided, such as trees, crowds, buildings, highways, pools, or ponds. The "control mooring" system is also useful when inexperienced operators are still learning how a specific multicopter responds to manipulation of the levers on the transmitter. FIG. 30 illustrates a quadcopter 3000 attached to a "control mooring" 3002 according to one embodiment of this disclosure.

Figure 27:
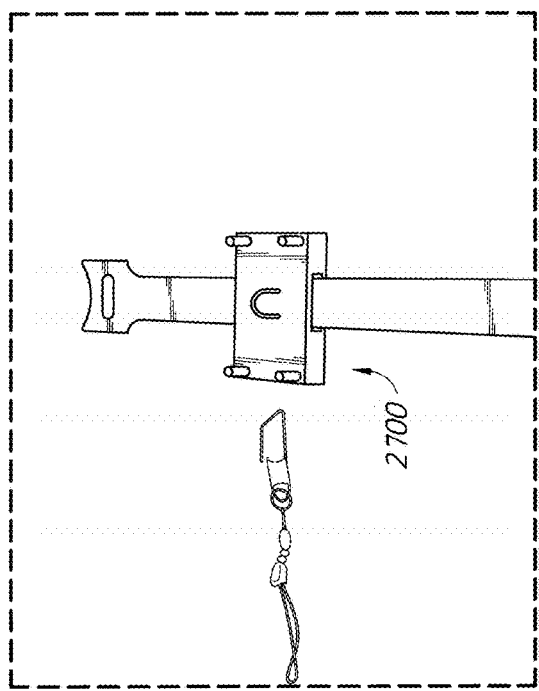
FIG. 27 is a drawing showing the eyelet on the bottom of a "control mooring" platform, according to an embodiment of this disclosure.
Figure 28:
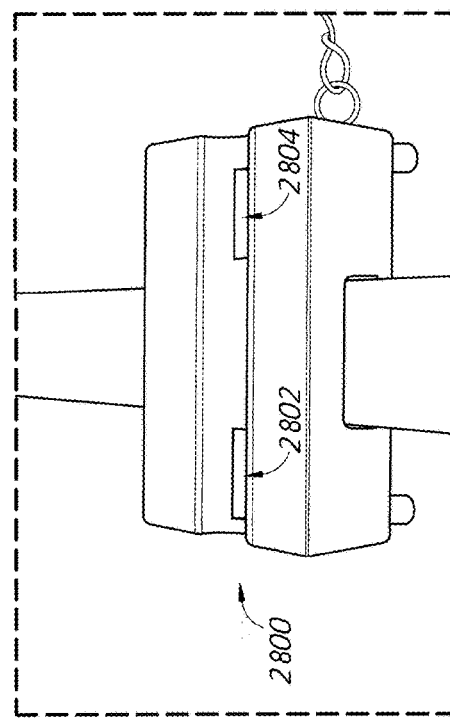
FIG. 28 is a drawing showing the mounting structures and ventilation holes for a "control mooring" platform, according to an embodiment of this disclosure.
Figure 29:
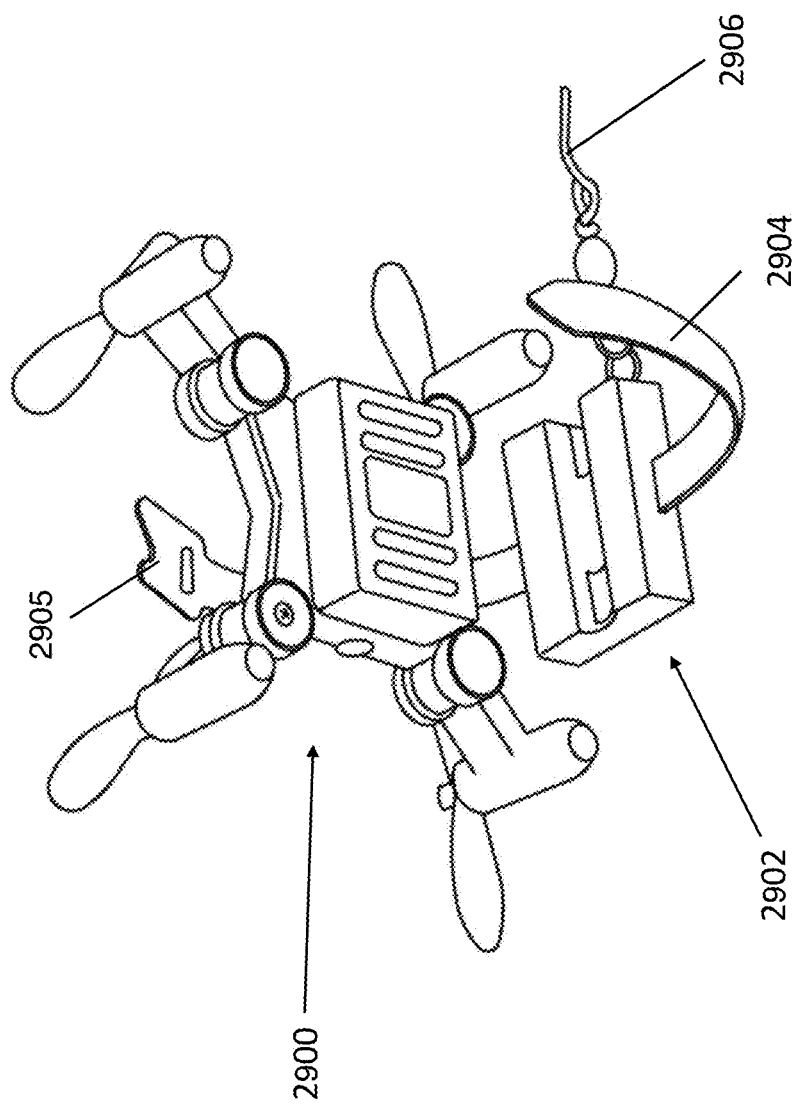
FIG. 29 is a drawing illustrating aspects of a "control mooring," according to an embodiment of this disclosure.
Figure 31:
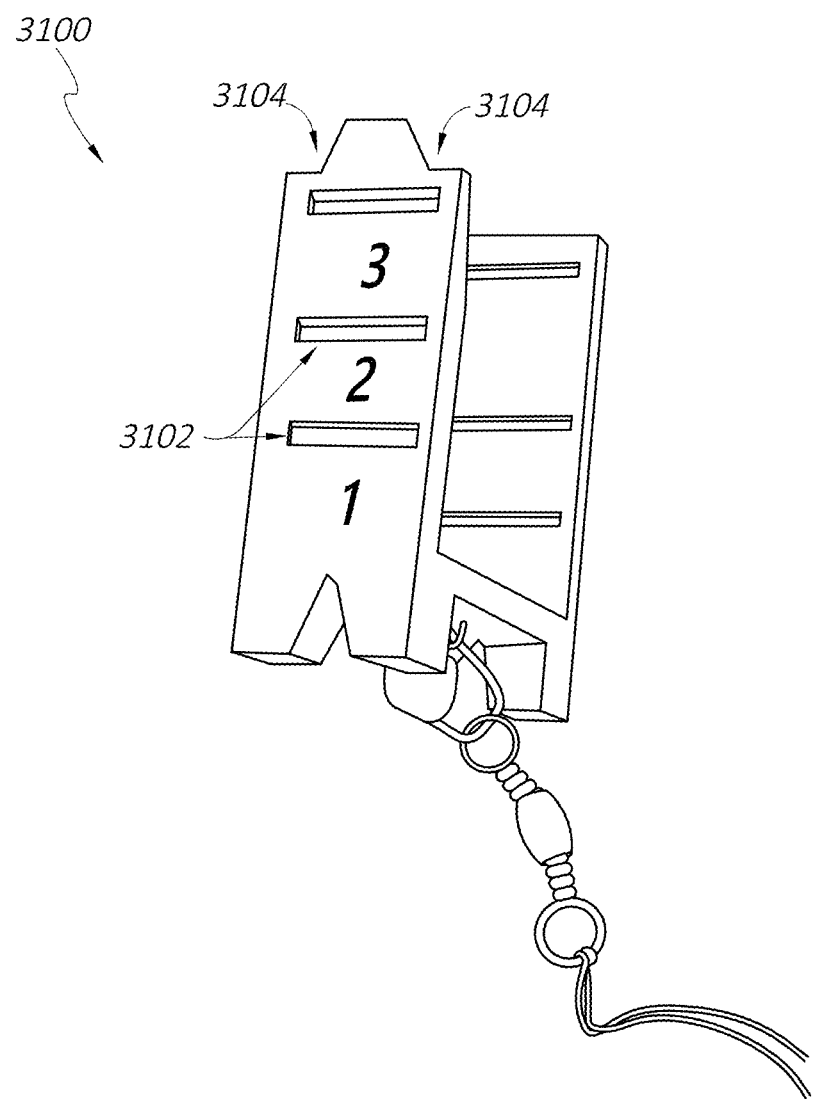
FIG. 31 shows a bracket for mooring a copter according to an embodiment of this disclosure.
Figure 33:
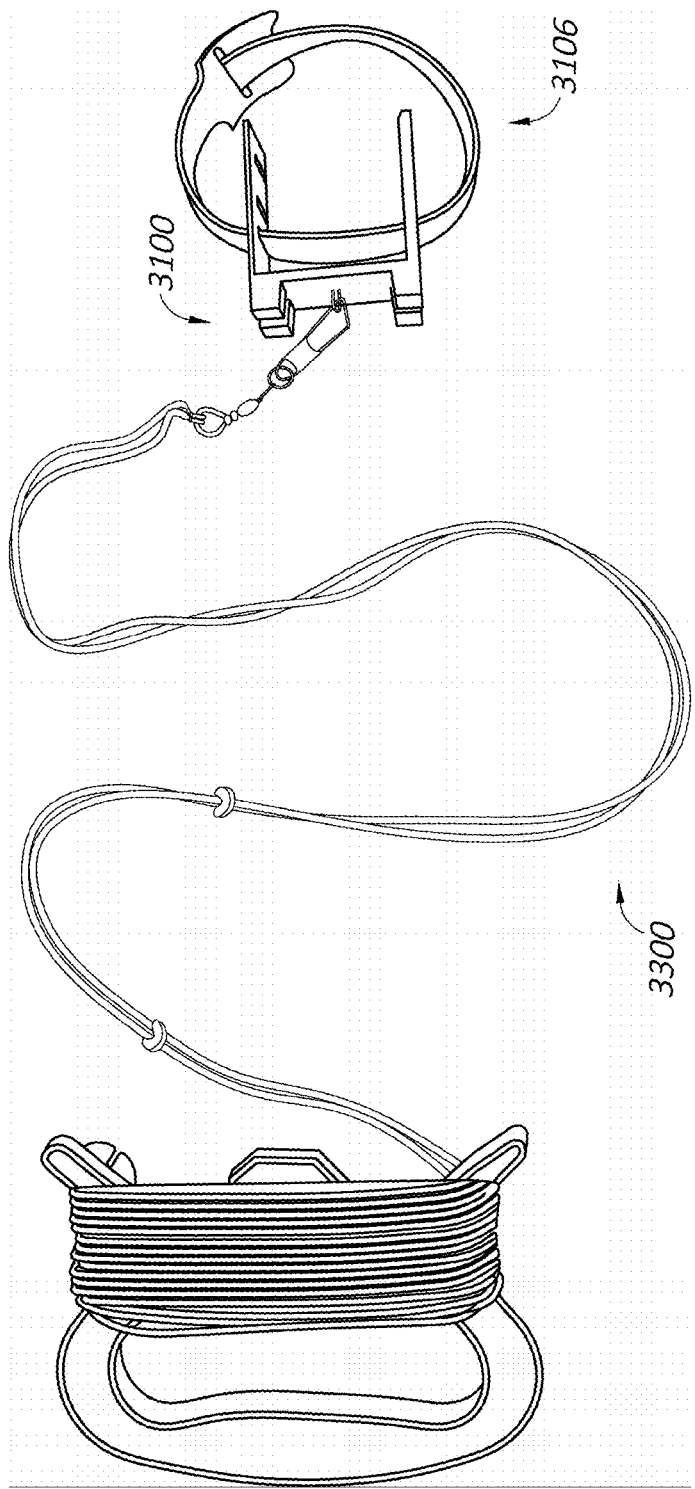
FIG. 33 illustrates a mooring system according to an embodiment of this disclosure.

In an embodiment of the system, two quick attachment systems are included. A bracket fits on the bottom of the quadcopter over the camera for popular selling quadcopter models with cameras on the bottom: MIX R/C® X400W; Holy Stone® Models F181C, F181W, & HS160 Shadow; and Syma® Model X5SW-V3. A small platform attaches to the bottom of these mini quadcopters with cameras in the fuselage: Hubsan® X4 H107C or H107D FPV or Rabing® WiFi FPV. A hook-and-loop fastener holds the bracket or platform. No changes to the quadcopter itself are needed for use with either the platform or the bracket. No changes to the quadcopter itself are needed for use with either the platform or the bracket. The mooring line can be used in several ways. A line can be fed from the reel as the quadcopter flies away or can be "moored" by selecting a length of line and placing any convenient weight (such as a rock or book) on the handle. As described, one component of the "control mooring" system is an attachment structure (such as an eyelet, platform, or bracket) located on (or below) the bottom of the multicopter or helicopter. This attachment point can either be created as an integral part of the copter's fuselage itself (such as an eyelet molded into the fuselage material when the fuselage is manufactured), or can be attached temporarily to the bottom of the multicopter in a number of different ways. In one embodiment, small platforms have been developed that can be attached with a hook-and-loop tie to a number of different quadcopter models with such a platform 2700, as illustrated in FIG. 27. This figure illustrates an "eye" that can be connected to a snap swivel on a line and "legs" to hold the platform flat level for calibration and launch of the multicopter with a mooring line attached to the snap swivel. In that embodiment example, the "control mooring" platform has been designed with structures that fit into holes or shapes on the bottom of one or more quadcopters to prevent shifting when mounted, and ventilation holes are included to maintain air flow to cool the quadcopter's battery as it discharges during flight. See FIG. 28, which illustrates a groove 2800 and ventilation holes 2802 and 2804. FIG. 29 illustrates a drawing of a quadcopter 2900 prior to attachment to a platform 2902 having straps 2904 and 2905. The platform 2902 is connected to a mooring line 2906. A user, utilizing the straps 2904 and 2905 secures the quadcopter 2900 to the platform 2902, thereby securing it to the mooring line 2906. In another embodiment, illustrated in FIG. 31, a bracket 3100 has been developed that fits over differing camera configurations that come with popular models of small quadcopters. Using bracket 3100 has significant benefits because it is capable of being used with a variety of existing quadcopter designs. As shown in FIG. 31, the bracket has multiple slots 3102 that allow a hook-and-loop fastener to be inserted in different positions for different existing quadcopter models. In addition, the bracket 3100 can also include notches 3104 which allow on-off switches on copters to be operated. To further illustrate attachment of the bracket, FIG. 32 the bracket 3100 mounted on different quadcopter models. One variation of this embodiment that adds utility is to reduce the size of the system so it can be carried in a purse, backpack, or several large pockets. This configuration is particularly useful for making "selfies" with a small copter because the mooring line holds the copter in position, even when there is some wind. FIG. 29 illustrates the way such a small copter is attached to a control mooring platform. To further reduce size and weight of the line winder and create a compact embodiment, the "tangle block" described above to reduce line tangling can be replaced by doubling the existing line and placing knots in it as shown in FIG. 33 and the line can be placed on a flat handle. Specifically, FIG. 33 illustrates the bracket 3100 and a hook-and-loop fastener 3106 with a doubled line shown by reference 3300. A flat handle is also shown. When used with existing "pocket sized" copters that fold and fit in a backpack or purse, a cell phone, the smaller leader and flat handle in FIG. 33, and the small platform in FIG. 27, these items comprise a "compact selfie system" that can be easily carried in a purse, backpack, or several pockets. This compact system allows photos of the operator (or the operator and a group) to be taken in front of landmarks during travel, at sports events, or other during other activities by using the control mooring line to maintain the copter in a stable position facing the subjects.

A person of ordinary skill in the design of such multicopters or plastic parts would recognize that other configurations can achieve the same purpose to level the platform, such as, for example, using triangles or other shapes (rather than round "legs") to increase the support for heavier copters before launch and during or after landing. This disclosure covers all variations of the platform design that accomplish the utility described here. In the embodiments illustrated, a snap swivel is used to allow the copter to rotate freely without twisting or tangling the line. Also, a "tangle block" 2500 (as described above) as illustrated in FIG. 25 can be used to reduce line tangle. In another embodiment, the function of the "tangle block" can be performed by attaching a length of approximately 2 meters of heavier line can be attached as a "leader" for the portion just below the snap swivel. Like the "tangle block," a "leader" of heavier line provides weight and rigidity that reduces or eliminates the tendency for lighter line to become tangled in the rotors, either in flight or during launches and landings. A person with ordinary skill in the design of remote controlled aircraft, 3D printing, or injection molding would recognize that the platform (or other attachment structures) could be produced in different sizes and configurations to fit varied copter fuselage shapes. Also, in order to appeal to different groups of potential users, the color and decoration on the platform and mounting straps or structures could be changed (including black, "rainbow" colors, camouflage, pink, silver, gold, stripes, photos, reflective surfaces, etc.). In other embodiments, a more complex attachment system could replace the hook-and-loop fastener, such as by adding "arms" or other structures to the "platform" that close over the top of the copter or otherwise hold the copter in a way that does not interfere with the operation of the rotor blades or cameras on the copter. Use of hook-and-loop straps has been found to be an effective embodiment for smaller copters, however, because that method has low cost and weight, fits different sizes and shapes of copter bodies, resists damage in crashes, and allows easy attachment and removal. These "control mooring" systems can be scaled to fit larger copters and will still provide utility in reducing the risk of flyaways, loss, or damage. For example, use of a "control mooring" could allow waterproof copters, such as "Splash Drone™" models, to be retrieved easily from the ocean, lakes, or other bodies of water if they lose the ability to fly for any reason. These and other variations of the "control mooring" embodiment add utility for applications discussed in the "sky moorings" section, including all embodiments in which "safety lines" are referenced in the descriptions below.

"Sky Mooring" for Rotorcraft

In the "gyro position" format, a small rotorcraft integrated with a kite is a simple illustration of the concept of a "sky mooring." In the embodiments discussed below, the "sky mooring" concept makes unmanned rotorcraft safe, reliable, and practical for a wide range of new professional, recreational, and public-safety applications. These "sky mooring" embodiments in this application all share the common goals of overcoming the limitations imposed by limited flight duration and/or payload capacity while creating the same type of transparency that is inherent in tethered kites, balloons, or visible structures attached to the ground. As discussed in the background, battery-powered rotorcraft can have short flight times, which are limited by battery life. Kites, however, generate lift from the wind and are not limited to being powered by a finite source like batteries, and their payload capacities are higher than for comparably priced rotorcraft. But because they are powered by the wind, kites can be less steady. A rotorcraft coupled to a kite adapter can provide a "sky mooring" for the rotorcraft. And coupling a camera to the rotorcraft can provide utility to first responders, naturalists, journalists, fisherpersons, and photographers—individuals who could benefit from aerial photographic capability, without being concerned about the battery life of the rotorcraft.

Figure 3:
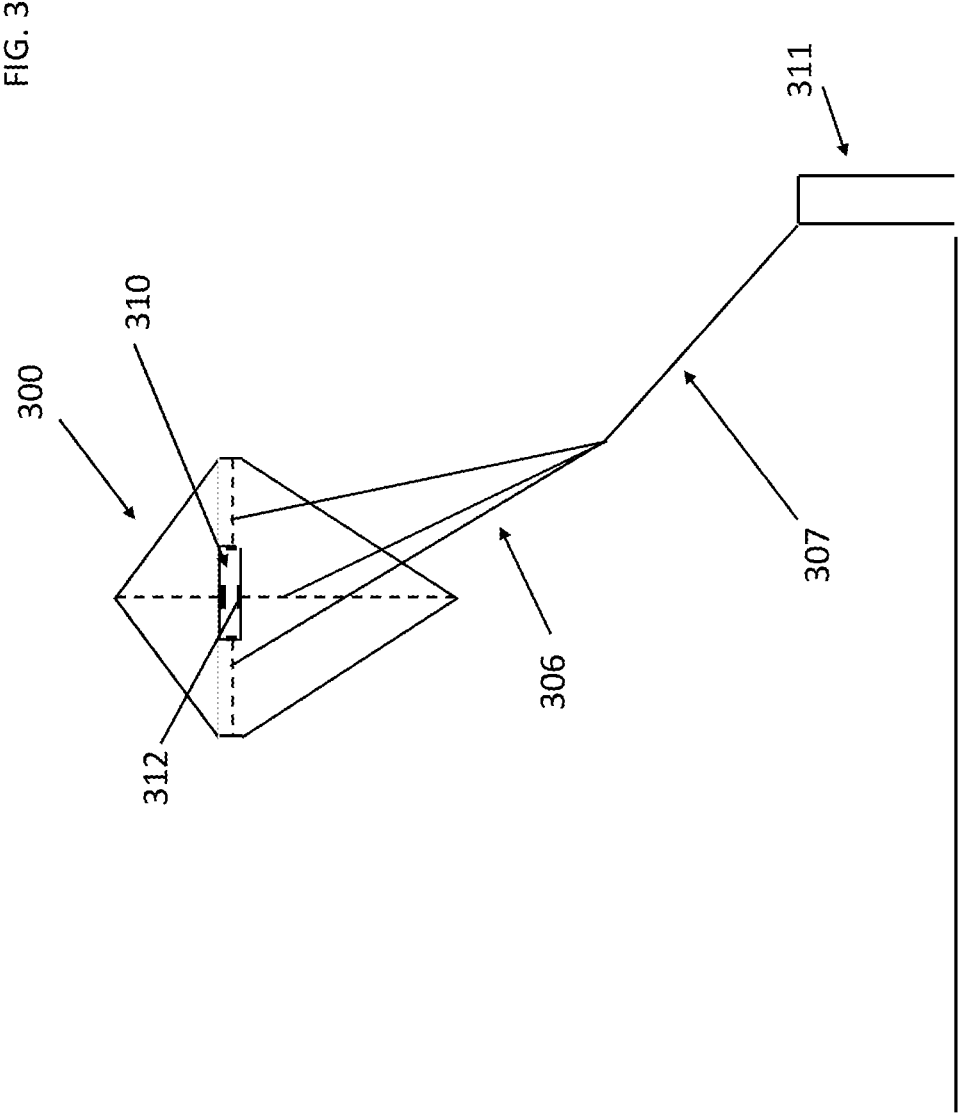
FIG. 3 is a perspective view of a kite adapter according to another embodiment of this disclosure.

FIG. 3 illustrates another embodiment of a kite adapter 300. The kite adapter 300, includes an opening 310 for a rotorcraft such as a copter (not shown). The copter can be secured to the kite adapter 300 by way of brackets 312. The kite adapter 300 is similar to the one shown in FIG. 2 in that the copter is in a "gyro position" when secured to the kite adapter 300. The kite adapter 300 is secured to the ground via a post 311 via a bridle 306 and a cord 307. In this embodiment, the kite adapter 300 acts as a sky mooring for the copter.

A camera can be attached to the copter and thus the integrated unit provides an operator with aerial photographic capabilities without concern for short flight time. The camera can weigh more when attached to a kite in this configuration than a camera that could be lifted by the copter alone, thus allowing features such as a remotely controlled telephoto lens or a precision gimbal to be included. This is because once the copter is secured to the kite adapter 300, the copter does not need to expend energy to sustain flight and can have a greater payload capacity than the copter integrated with it. Moreover, though the kite adapter, as with traditional kites, may be unsteady at times in the wind, the copter rotors can be controlled by an operator to steady and point the integrated unit. In addition, as described in other embodiments, the copter can be secured to the kite adapter 300 such that it functions as a freely moving gimbal to point and control the camera or other devices (such as radar guns or infrared sensors), or the camera can be attached to the copter via a gimbal. In either configuration, the sky mooring provided by the kite adapter 300 and the copter when secured to the kite adapter 300, provides a steady aerial perspective from which photographs can be taken or other operations can be performed. This would allow for a multitude of applications. For example, observation of a wildfire that is partially extinguished to detect "hot spots" that require additional attention, photography of an outdoor wedding, suspension of strings of lights to be activated for an aerial light display that spells words or creates symbols for advertising or entertainment, or photography of other things being observed, including wild life, water safety, rescue operations, or police surveillance. Infrared capabilities and a spotlight could allow use at night by a police department.

Optionally, when the camera or rotors are not in use or needed, the copter can be put in "sleep mode" remotely, in which the radio receiver remains active but stabilization features are disabled. This would further conserve the energy of the copter. The kite adapter 300 could also be made from solar material such that the kite adapter 300 could gather solar energy and charge the batteries of the copter. Other methods of recharging the batteries of the copter fall within the scope of this disclosure, including implementing chargers on the kite adapter 300 or including batteries attached to the adapter, such that when the copter is moored to the kite adapter 300, the batteries of the quadcopter are charged. A light weight power cord could also be connected to the kite adapter such that power to recharge the batteries of the copter or activate lights or devices (such as radio repeaters) on the "sky mooring" could be supplied remotely.

In another embodiment, the copter can be released remotely from the brackets 312 and then fly free from the kite adapter 300. In this embodiment, the copter could be fitted with rods, servos or other structures that connect to the brackets 312 to secure the copter to the kite adapter 300. The rods, servos or other structure could be controlled remotely to retract or move in order to release from the brackets 312, which in turn would release the copter from the kite adapter 300. Alternatively, the brackets 312 could be designed to remotely clasp the copter when the copter is in the opening 310 and the operator wishes to secure the copter to the kite adapter 300. The operator could then release the copter by remotely unclasping the brackets 312 and using the rotors in the copter to cause it to "take off" from the adapter. The remote control of the brackets 312 or the rods, servos or other structure described above could be achieved through a button or other interface on the copter controller or controls on a separate, dedicated remote control unit.

To be more specific, here is a more detailed example of the remote launch system using the UDI™ U818A, a popular low-cost quadcopter. First, prop guards must be placed over the props on the U818A, such as by attachment using polyurethane glue (such as Original Gorilla™ Glue) of pieces of ping-pong netting over the tops and below the bottoms of the circular guards around each rotor. Alternatively, lines for the bridle or the tethering cord could be enclosed or coated to make them more rigid. These adaptations are designed to avoid line-tangle during operation. Next, a frame consisting of carbon fiber, bamboo, or fiberglass rods is constructed that is large enough to receive the U818A and that has a least 3 inches of clearance on all sides. This construction can use Kevlar™ thread and/or cable ties to wrap the joints, which are secured with Gorilla™ Glue. Depending on the lifting capacity of the kite or balloon to be used, the launching frame can be a simple rectangle or, for more stability, multiple rectangles that are mounted together with perpendicular rods about 1 or 2 inches apart. In the "launch-only" configuration, two grooved pieces are then constructed from halves of carbon fiber rods or joined pieces of bamboo in order to attach the landing skids of the U818A. These are mounted perpendicular to the frame and attached on top of the lower horizontal bars in the frame of the launching system so the U818A is held in the middle of the "box" with the front facing toward the rear of the kite, balloon, or structure used to suspend the frame. Loose zip ties are then attached with Gorilla™ Glue to hold the front portions of the skids of the U818A on the ends of the supporting grooved pieces with slack that allows them to slide off if the U818A is pushed forward an inch or less. A piece of carbon fiber rod or bamboo is mounted to keep the U818A from sliding backward beyond the point that is the center of gravity for the system when it is mounted (after attachment of one or more servos, as described below). Adjustments must be made so the U818A can lift, slide forward so the zip ties on its skids slide off the grooves below, and take off for normal flight. Then one (or, if lift is sufficient, two) standard model aircraft servos are mounted so the servo arms hold the rear vertical support(s) of the U818A against the backstop when it is positioned at the center of gravity of the launch system at the "locked in" position. The servo(s) should be adjusted so activation releases the U818A and pushes it forward enough for the zip ties to move over the edge of the groove. A small RC radio with its own light receiver battery is then connected to the servos, bound with any RC controller, and is configured so a switch on the controller will activate all servos and "launch" the U818A. Control of two servos by a single receiver channel can be achieved using a simply "y" connector. In a production model, control over launch might be achieved using the copter's remote controller with a dedicated switch and with a separate binding to the receiver on the launch assembly.

A more elaborate implementation of the launch system is described in the launch-and-retrieval discussion, below. Other variations of this system would be apparent to anyone skilled in construction of model aircraft. If charging is desired, the light USB charger for the U818A would be taped in place with the line extended so it could connect with the female USB connector joined with a male USB connector supplying power from solar material on the kite, balloon, or structure. When the U818A is launched, the USB connection would be pulled apart by movement of the copter, and the light charger would remain attached to the copter. Power could also be supplied from a supplemental battery attached to the source of support or from a power line if the assembly is mounted on a structure. The launch assembly could then be used for remote controlled launch from an elevated location with support coming from a variety of sources, including not only kites and balloons but also a manned aircraft (including a manned helicopter) or a structure, such as a tower or the top of a building. If a safety line is to be used with the U818A, that could be added as discussed below.

Providing the ability to release the copter from the kite adapter 300 opens additional uses. The copter could be sent on a "photo assignment," "surveillance assignment," or "fishing trip." The ability to preposition a multicopter with an elevated "sky mooring" is also useful when some event is expected to occur after a period of time that requires waiting, such as wildlife that may appear and merit closer photograph (e.g., dolphins surfacing near a shoreline); fish beginning to feed on the surface that indicates a promising fishing location; a wedding ceremony concluding and the camera needing to follow the bride and groom as they exit the ceremony; or some other important event beginning after an uncertain delay. In settings such as an outdoor wedding, releasing the copter from the kite adapter would be safer, less obtrusive, and more effective than sending a photographic copter from the ground as the event was progressing because the copter would already be aloft and, as such, would create less noise at ground level and would already be in position to easily avoid any objects or people that might obstruct flight by a copter launched from the ground. If a safety line is used, for example as discussed above in the "control mooring" embodiment with a mooring line, the copter could be confined to a specified distance from the "sky mooring" so there would be virtually no risk of accidentally flying into or over a seating area for guests or other areas where a flyaway or wind gusts could cause damage, injury, or anxiety. The safety line would tether the copter to the kite adapter, so even though the copter could be released from the kite adapter, its range of flight would be limited. Furthermore, the safety line could also be fitted with weights (such as one or more of the "tangle blocks" described above or small "shot" weights used in fishing positioned at intervals along the line) or with a heavier line "leader" as discussed above to help keep the line from obstructing the copter. The safety line could also have a remotely controlled winder (as discussed below) attached to the "sky mooring" to allow retrieval if the copter loses the ability to support itself for some reason and needs to be drawn back to the sky mooring. The copter could then be retrieved, repaired, and used again. One variation of this would use one or more copters and one or more sky moorings that would all be waterproofed so rain, high winds, or landings by the copter in water would not damage any of the components. This weather and water resistance would allow use during inclement weather (such as floods) for public service purposes and operation near or over the ocean or other bodies of water, or during rain, because water exposure would not damage any of the components.

In the event the safety line is cut or otherwise untethered to the copter, the copter can be configured to enter a safe or emergency landing mode (which is a mode known on certain rotorcraft) that automatically and safely lands the copter. In one embodiment, the safety line could be connected to a safety switch on the copter, with the safety switch activated before the copter is released from the kite adapter. After release or takeoff is detected, the safety switch would monitor line tension and cause the aircraft to go into "low battery mode" (and thus execute an immediate, soft landing) if tension is not reapplied promptly. The safety switch would be deactivated and the copter would land if the tension from the safety line is not detected for a pre-set period. Or alternatively, the copter could be programmed to fly automatically back to, and be retrieved by, the kite adapter or other sky mooring if the safety switch is deactivated. The safety switch innovation allows the copter to be flown with the safety line if tension is applied, at least periodically, to the safety switch. The safety switch could also be deactivated if the copter flies above a certain altitude or below a certain altitude. While the safety line and safety switch has been described in connection with the sky mooring, it should be understood that a copter could employ a safety line and safety switch without a sky mooring or other kite adapter. For example, the safety line and switch can be used for children through optional parental control features to improve safety and guard against misuse of the copter. It could also be used for training purposes for inexperienced copter operators.

Figure 26:
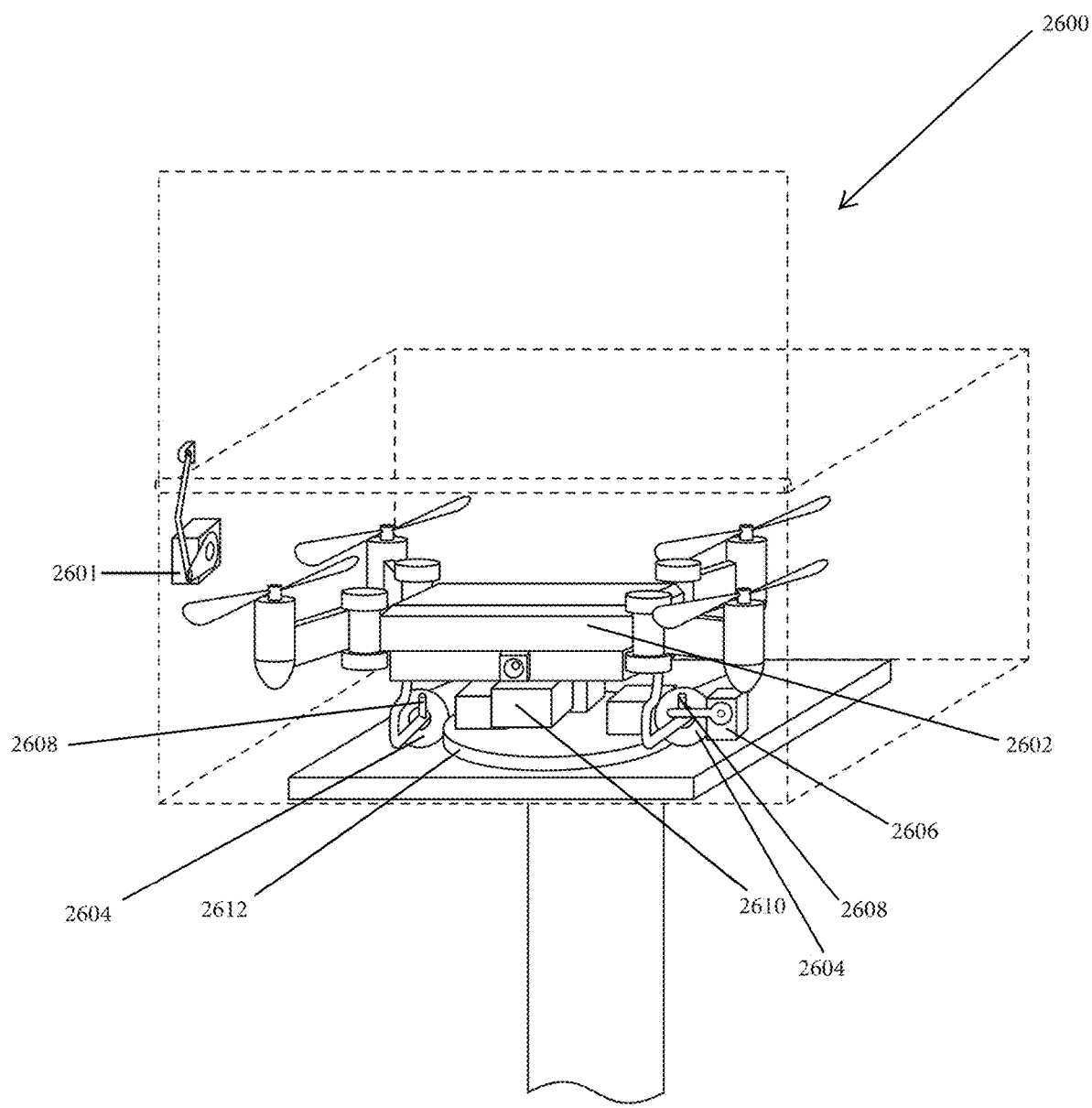
FIG. 26 illustrates a "sky mooring" enclosure for a copter according to an aspect of this disclosure.

Next, in an even more versatile (and expensive) embodiment, the rods, servo, or other structures described above for the launch mechanism in the enclosure can also be used to allow return of a copter to the "sky mooring" after it is dispatched. As one example, in the kite adapter 300, the docking structure can include two tubes (perpendicular to the opening) rather than the "grooves" as described in the example for the U818A above. The tubes facing the back of the kite would have "guide funnels." The funnels would guide landing skids of the copter into the tubes. If the copter includes a "first person view" (FPV) camera, it could have a "sight" built into the retrieval structure that is positioned so the copter can be aligned properly using the FPV camera for the landing gear to slide into the funnels, and then the funnels would guide the landing gear into the tubes. On the copter, each landing skid might be shaped like half of a traditional wire coat hanger with the hook cut off. The copter would be mounted where the coat hanger's hook used to be and the sharp ends on the bottom would face forward on the copter (one on each side). These "skids" would then slide into the funnels and into the tubes. (Note that the funnels and tubes need grooves cut in the top to allow the support rod for each skid to slide in enough for the copter to reach the center of gravity for the launch-and-retrieval system.) Once the copter is "flown" to the center of gravity in the launch system, a clasp or moving servo arm would "capture" the copter and lock in place, as described above. Other parts of the copter could "mate" with the retrieval station when it is captured for more stability and for other purposes. In a variation of this embodiment, a box-shaped enclosure with a door that could be closed and locked remotely could have the tubes and funnels described above facing forward; this would allow the copter to be retrieved from the front so the door could close behind it for protection of the copter and other systems from weather and tampering. In this embodiment, the copter would launch by flying backward out of the enclosure through the opening. Alternatively, the copter could be designed to be retrieved by flying in reverse, which would position it for relaunch in a forward mode, as illustrated in FIG. 26. In another embodiment, the mounting system could rotate, as described below, which would permit the copter to be inspected with a camera inside the enclosure or to move over alternate payload modules for attachment to the copter. In this embodiment, the enclosure might also have both a forward and rear door, allowing the copter to be retrieved or launched from two positions. A person with reasonable familiarity with multicopters would recognize that other variations are practical using this general structure.

For example, recharging of the copter battery could be activated in one of many ways once the copter is secured, including use of an induction charging system of the type used by electric toothbrushes to charge batteries without a physical connection or a moving plunger that makes an actual connection to a USB port. This system could have independent utility even if not mounted on a balloon or kite that could be retrieved; if mounted on the light poles of a sports stadium, for example, the "launch and retrieval systems" might be weather-proofed and remain in position permanently, but copters with appropriate adaptations could be "flown up" and placed in position before a scheduled event and then flow down and stored safely after the event ended.

The sky mooring concept for copters has many public safety applications, particularly when the concept of special-purpose copters is also applied. For example, kite adapters or balloons with copters in launch systems could be put up near anticipated high-risk events to observe people and dispatch one or more copters to take photographs and intervene to prevent any illegal activity or risks. One launch system enclosure could be used with a number of copters that share the same landing skids and body design, and the enclosure could be designed for easy attachment between different support systems, including kite adapters, balloons, use on security towers, or on roofs of buildings. A single launch system could be used with a number of different special-purpose copters that are designed or equipped for specific situations, and a police department could simply select the appropriate special-purpose copter for the planned use. The cost of copters is relatively low and is expected to drop lower, so maintaining multiple special-purpose copters for use with one sky mooring system (or a series of such systems, as discussed below), is both practical and cost effective. For example, police (including Secret Service officers) who are dealing with crowd risks at events such as a marathon, protest march, or Presidential Inauguration could use "crowd management" copters equipped with public address systems (like those in some police cars) so a copter could fly down over an apparent disruption in a crowd to give loud, localized vocal warnings to persons in that specific area if a dispute arises or if there is concern about a possible unsafe package or weapon. All this would be recorded on video for use as evidence later and would be visible to the operator using an FPV camera. The copter could also have an "intercom" feature that allows the operator to hear responses from those who are near it. If the issue is resolved peacefully, the copter could then return to its "sky mooring" and continue to provide a video feed while its batteries are recharged.

Special-purpose copters would become even more useful if "sky moorings" are equipped with the capability to support a number of variations that all share the same landing devices and physical dimensions. A "payload module" that fits into a position on the copter as part of the copter's fuselage could carry specialized equipment or payloads. As described below, these "payload modules" could either be changed manually by an operator before a planned use or a sky mooring enclosure could be equipped with the "changer" system described below to "swap" payload modules quickly and remotely.

As noted, FIG. 26 illustrates an embodiment of a "sky mooring." For example, FIG. 26 illustrates an enclosure 2600, in which a copter 2602 is positioned. The copter 2602 includes a set of landing skids that can be positioned in funnels 2604. The enclosure 2600 also includes a servo 2601 whereby opening and closing of the enclosure can be achieved remotely. The system described in FIG. 26 also includes another servo mechanism 2606 for locking the copter in place when the skids are positioned in the funnels 2604. In this embodiment, the servo 2606 acts like an arm at a typical railroad crossing. The servo 2606 rotates to a 12:00 position to release the copter, and as shown in FIG. 26 is in the 9:00 position to lock the copier into place. The skids of the copter 2602 include protrusions 2608, with the protrusion on the right skid abutting the servo 2606 when the servo 2606 is in the locked position (i.e., the 9:00 position).

The protrusions 2608 on the skids fit against the funnels 2604 This is what holds the copter in the tube after it "lands" in the mooring. The protrusion 2608 on the left skid is useful, even without a corresponding servo, for balance of the copter in flight and because it provides a "stop" so the skid on the left goes the same distance into the tube as the one on the right. This "stop" position, in turn, helps to hold the copter accurately in the same position at all times after docking so a plunger (which is not shown) can remove a module. More specifically, the copter includes a module 2610 and beneath this module 2610 and the copter 2602 is a turntable 2612 supporting a plurality of modules that can then rotate (like a CD changer) to move the "old" module 2610 away and position a different module under the front. The same plunger below the turntable can then lift that new module up to fit into the "module receptacle space" so the copier is ready for a different "mission" with different supplies or equipment.

The sky mooring concept, combined with the launch and retrieval system and changeable payload modules, mitigates payload-capacity and flight-duration limitations because copters can be equipped for specific purposes and the appropriate configuration can be pre-positioned in sky moorings to meet the needs of specific events or risk areas. For example, one "fleet" of public safety copters (operated by a police department or other governmental agency) could also carry special devices to "intervene" at trouble spots. If properly licensed for police use, these devices might allow possible use of a crowd-dispersal device, such as pepper spray, mace, tear gas, or even a Taser. The ability to control these devices remotely would reduce risk to police because an irrational person who seems to be dangerous could be confronted remotely.

Such a fleet of special-purpose copters could then be reconfigured—or replaced by other copters—for use in the same sky mooring systems to deal with other anticipated public-service needs. For example, in preparation for a gathering at which medical issues seem more likely to create risks than disruptive behavior (such as a college reunion or charitable fund raising rally), a police department or other agency could replace some or all of the "crowd-management copters" described above with "medic copters" (or copters with "medic payload modules") in its sky moorings system (s). If kites or balloons were used for support, these replacements could be made on the ground; if the sky moorings are mounted on structures that are difficult to reach (such as light towers around a sports stadium or cell towers), changing the special-purpose copters could be easily achieved using the "launch and retrieval systems." The "medic copters" could be equipped with the public address and "intercom" systems (as described above) for communication with bystanders who might gather around someone who passes out or appears to be having a heart attack. The special "medic copters" could carry medical devices and emergency medications, such as "EpiPen®" for allergic reactions, naloxone (also called Narcan™) to treat opioid overdose, and a light-weight Automatic External Defibrillator (AED) for a victim of cardiac arrest. Operated by someone with medical training, the copter could reach the location of a person in distress more quickly than paramedics (especially if, for example, multiple "sky mooring" locations existed around an event, such as on the lights poles around a stadium, each with a "medic copter"). Using the camera and intercom, the operator could determine if a doctor or other person with medical training was present and, if the copter carried anything helpful, could explain how to access it. If no one with medical training was present, the operator could provide instructions to "talk through" (and observe on the FPV camera) use by a bystander of medical equipment on the copter, such as an AED, naloxone injector, or EpiPen. With the ability to retrieve the copters and replace them easily with others, the type and mix of special-purpose copters in the "sky moorings" might be changed (manually or remotely, as described above), either when supported by kites or balloons or permanent structures, to suit different needs. If a stadium had to be used during an emergency for those who were not able to stay in their homes (such as during a hurricane), and if multiple sky moorings were mounted in the towers that support the lighting systems, the "mix" of special purpose copters might be changed to include some with "crowd management" features and others that are "medical copters," for example. As noted above for more sophisticated embodiments, the copter might accept interchangeable "payload modules" that contain equipment for specific uses, and a "module-changer" (using existing technology similar to that in CD changers) in the sky mooring (as illustrated in FIG. 26) could allow the operator to install any available module by remote control.

Special purpose copters in "sky moorings" could also be used during disaster recovery (e.g., an earthquake), regulatory monitoring, or search and rescue operations. In earthquake-prone areas, for example, copters could be stationed in sky moorings (either supported by kites, balloons, or mounted on earthquake-resistant structures) and dispatched quickly after a quake if there is a report of possible sounds from trapped survivors. The copters could carry the intercom system described above to have two-way communications between the operations center and anyone on the ground to describe conditions. Almost any standard multicopter would automatically send back its precise GPS coordinates and photos from the location, and, in the earthquake example, the copter could be equipped with an attached listening device to amplify sounds and direct volunteers until heavy equipment could arrive. In an avalanche situation on a ski slope, special purpose copters from sky moorings could search for those who were trapped under snow using infrared devices and could carry limited rescue supplies. Regulatory agencies could use sky moorings with specialized copters for compliance monitoring. For example, remotely-viewable video cameras in conjunction with specialized copters in a network of sky moorings could allow an environmental regulator in a central location to observe smokestacks at multiple high-risk industrial sites and remotely "dispatch" one of those copters for on-site air testing whenever an anomalous emission is suspected (or for routine air sampling at various altitudes). In the case of a lost animal or lost person, especially in rough terrain, specially equipped copters from sky moorings could operate for long periods of time from a supporting kite or balloon and still be "dispatched" for a closer look if something is observed on the camera (or reported by a ground observer) suggesting that the subject of the search might be in a particular location. An embodiment that includes a signal repeater on the sky mooring system would allow two-way communications even in mountains, both to control the copter and to allow cellular communications with a phone the copter might carry to the lost person.

In addition to delivering a cell phone that would work with the repeater on the sky mooring system to communicate with a lost person when they are located (so they could report on their status and needs), such search-and-rescue copters might carry water and first-aid supplies. As noted above, copters coupled to "sky moorings" could also be used in fighting forest fires (or other types of fires) by watching for "hot spots." Tethering of multicopter in a forest fire environment (by integration with a kite, balloon, or control mooring system) would avoid the risk that the copter might interfere with aerial fire-fighting operations. The effectiveness of those units could be increased by including specialized equipment, such as infrared temperature-sensing gear, to check on conditions on the ground, send photographs, and determine the most effective deployment plan for firefighters. For clarity, while some embodiments on the sky mooring concept have been described only in connection with a kite adapter, it should be understood that balloons, balloons attached to kites, arrays of kites, or other structures attached to the ground could constitute a "sky mooring." In addition to light poles (such as those at sports stadiums) that were mentioned above, buildings, bridges, highway signs, cell towers, and other structures could function to support a sky mooring for the copter and could be equipped with a variant or embodiment of the launch-and-retrieval and provisioning systems described above. Sky moorings might also be positioned by attaching them to manned aircraft (including helicopters) or other vehicles, such as police S.W.A.T. team vans, fire trucks, cranes, or boats. In some adaptations, a telescoping tower could be attached to a vehicle (or positioned temporarily with a tripod or other base) to elevate the sky mooring above trees, crowds, or other obstructions, optionally in conjunction with an observation "booth" in which one or more police or security officers could also observe events directly. Further, to be clear, the use of a safety line from the "sky mooring" to a copter that is dispatched is optional for all of these examples. Some of the embodiments discussed above to prevent line tangling and described below in connection with retrieval mechanisms should expand the utility and practicality of including a safety line.

If the wind is low, such that the wind alone cannot support the kite adapter 300, and the copter has enough power to support the kite adapter 300, an embodiment where the kite adapter 300 provides charging capabilities can still reduce the net power consumption of the copter. This would extend time to "tarry" to wait for an event. The copter could then be released from the kite adapter 300, and the kite adapter 300 will descend to the ground and can be retrieved as described in more detail below. To be clear, the embodiments where the copter can be remotely released from the kite adapter 300 can be capable of sustained flight. This is somewhat different from earlier embodiments where the copter was not capable of keeping the integrated unit aloft. Regardless, benefits of the embodiments herein are described and would be understood by persons of ordinary skill in the art. The kite adapter would remain aloft regardless of whether the copter is moored in the sky mooring, is attached to the kite adapter with a safety line, or the copter has landed at some other location after launch by the sky mooring.

The kite adapter 300 could also utilize helium or other gas that is lighter than air to make it more stable and keep it aloft even in low wind conditions. For example, the kite adapter 300 could contain pouches or balloons that could optionally be inflated in low-wind environments to make it easier to lift and catch the wind. In other embodiments, the kite adapter 300 might be suspended, in part or in whole, by a traditional balloon above it. The kite adapter could also be towed behind a moving boat, car, or other vehicle, and might be structured as a "gyrocopter," in which event it would still be classified by FAA regulations as a "kite." Optionally, a balloon might be the only source of support and might be large enough to lift the copter. In this configuration, the balloon would keep the kite adapter and copter aloft and the copter would still have the release (or release and retrieval) abilities described as to other embodiments.

For docking capabilities, such as those described above, additional stability for the kite adapter may be helpful. Such additional stability may be provided with multiple copters mounted in a gyro position or by connection with other kites or balloons in an array. In this embodiment, the kite adapter could have a larger surface area to accommodate multiple copters. For example, calculations have shown that a single large sled kite less than 20 feet long could not only support multiple "stabilizing" copters but at least one "dispatch" copter weighing multiple pounds. Alternatively, this embodiment could comprise a combination of a balloon, other attached kites, and kite adapter as described above, to support multiple copters. The multiple copters could be used for stability and be permanently attached, while having an opening or sky mooring for a third copter that can be released and docked to the kite adapter.

After the kite adapter 300 is no longer needed to be aloft, it will need to be retrieved. This can be achieved through powered or manual cord winders. While a single cord is depicted along with a three-legged bridle, it should be understood that multiple cords and different bridle configurations can be used without departing from the spirit of this disclosure. The retrieval of the kite adapter 300 could also be achieved through line retrieval stations that are attached securely to the ground, a building, or a vehicle. This embodiment would make retrieval safer in cities or near crowds. The retrieval of the kite adapter can also be accomplished by a single operator, especially, for example, if a powered winder controlled by the operator is used.

Other methods of retrieving the kite adapter 300 can be used without departing from the scope of this disclosure. For example, the kite adapter 300 could include motors and an RC receiver to assist with the retrieval process or could have sustained flight capabilities like a powered glider, or include rotors for lift. In this embodiment, the kite adapter itself could be an unmanned aircraft system, either tethered or held in position by the copter. In this embodiment, the copter could lift the kite adapter and the kite adapter could fly down on its own. A power cord from the ground or a sky mooring station could also be employed to power the kite adapter. As noted above, the safety line between the sky mooring and a copter that has been dispatched could be used to be pull the copter back to the sky mooring where both the copter and the sky mooring could be retrieved (or accessed) at the same time.

The kite adapter could also include a parachute that assists in the landing of the kite adapter 300. For example, if the kite adapter 300 is made of solar cell material to collect solar power, the copter could go up with the kite adapter 300 attached (including optionally with balloon support) and a parachute could activate to make the descent slower for the "kite" portion. For some purposes and in some less-populated areas (such as animal surveys in rural Africa), the mooring station might float free and come down by parachute after the copter is launched. A radio retrieval system that can communicate the location of the descended kite adapter to the operator could also be used to retrieve the kite adapter.

In addition, the kite adapter could have a remotely controlled feature that allows some or all of the fabric or body of the kite adapter to be "released" (or the solar cells "collapsed") so there is little or no wind resistance. This would improve the effectiveness of the kite adapter if high winds, such as those associated with a hurricane or storm, arose while it was being used. Further, in this embodiment, a parachute could deploy to help lower the kite adapter (with or without one or more moored copters) under control of the line-retrieval system. This embodiment could be a safety feature for use if winds pick up unexpectedly and retrieval needs to be done quickly to maintain control.

In another embodiment, the sky mooring concept could be executed using a larger copter that supports a smaller copter (and perhaps also to hold a "sail" with solar panels. The large copter could then launch the smaller copter (using the same technology with rods, servos, or other structure as discussed above, perhaps, from the "sail"). With regard to launch and retrieval of a copter from a sky mooring station with a safety line, a line-feed and line-winder system can be included in an embodiment to facilitate retrieval and increase safety. For example, a series of sky moorings with cameras might be positioned around the perimeter of a prison or a high-security facility. The special-purpose copters might be equipped with safety lines that are "fed out" under electronic control as the copter flies over the "protected area" for closer surveillance or use of the intercom system (described above) in a specific area. If the copter is asked to "return to home" (a common feature in many such copters), the line winder would rewind based on telemetry from the copter that shows its position (another common feature in such copters). The safety line could also be used to disable certain features if it were detached or broken. For example, in the prison-surveillance example, the special-purpose copters might be equipped with Taser devices to disable an escaping prisoner. In order to keep the copter from being seized by inmates and the Taser (or other payload items) from being removed and used as a weapon, the special-purpose copter might have a feature that disables (or destroys) the Taser (or other payload items) if it detects the safety line has been disconnected. This could be accomplished with a thin wire as part of the safety line that carries a radio signal. If the signal is disrupted, the self-disabling features of the copter might be activated. There are other variants of this concept that can be easily understood and implemented.

Figure 4:
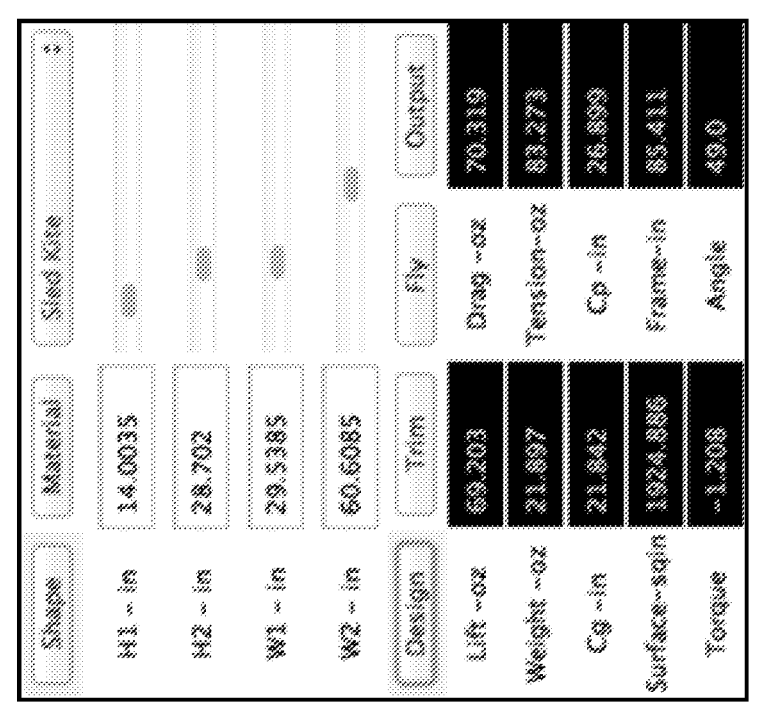
Figure 5:
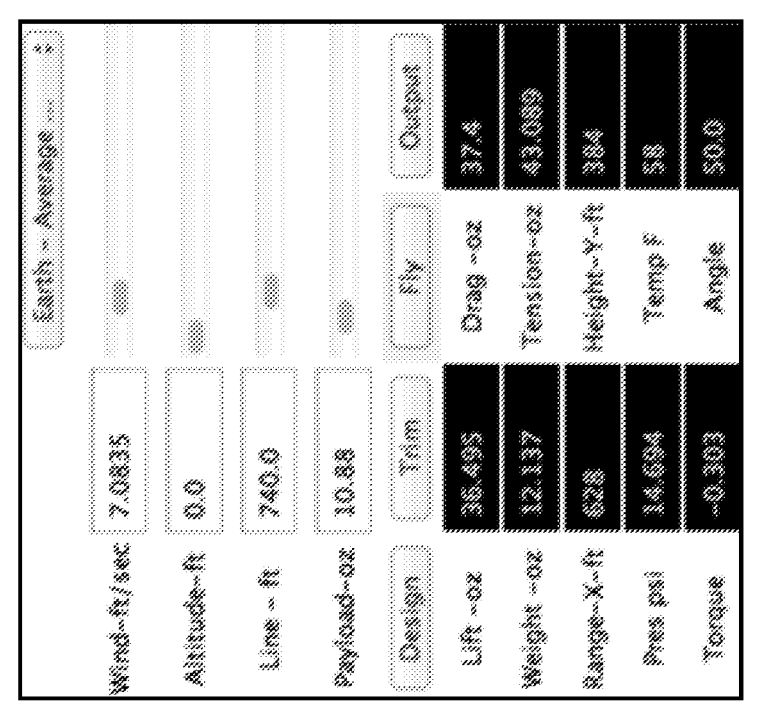

Calculations have shown that it should be feasible to lift "sky mooring" stations to support sophisticated copters, even in relatively low winds. FIG. 4 is a chart showing characteristics for a sled kite having a first height, H1, of 14.0035 inches; a second height, H2, of 28.702 inches; a first width, W1, of 29.5385 inches; and a second width, W2, of 60.6085 inches. The data in FIGS. 4 and 5 is from NASA's kite simulator. FIG. 5 illustrates additional data for the kite having the dimensions shown in FIG. 4. FIG. 5 illustrates, for example, in wind that is 7.0835 feet per second (about 4.77 mph), the lift of the kite being 36.496 ounces and a payload of 10.88 ounces. This kite would be able to hold a small quadcopter, which typically weigh less than 10 ounces. While it is true that the kite shown in FIGS. 4 and 5 would have reduced lift as a kite adapter given that the openings in the kite adapter to accommodate the copter would reduce the surface area of the kite adapter and therefore correspondingly reduce the lift. However, reduction in lift caused by the openings can be compensated by the surface area of the copter itself, or the mesh covering the rotors, or by enlarging the surface area of the kite adapter. Other methods for generating lift for the kite adapter may be implemented without departing from the scope of the disclosure.

Figure 6:
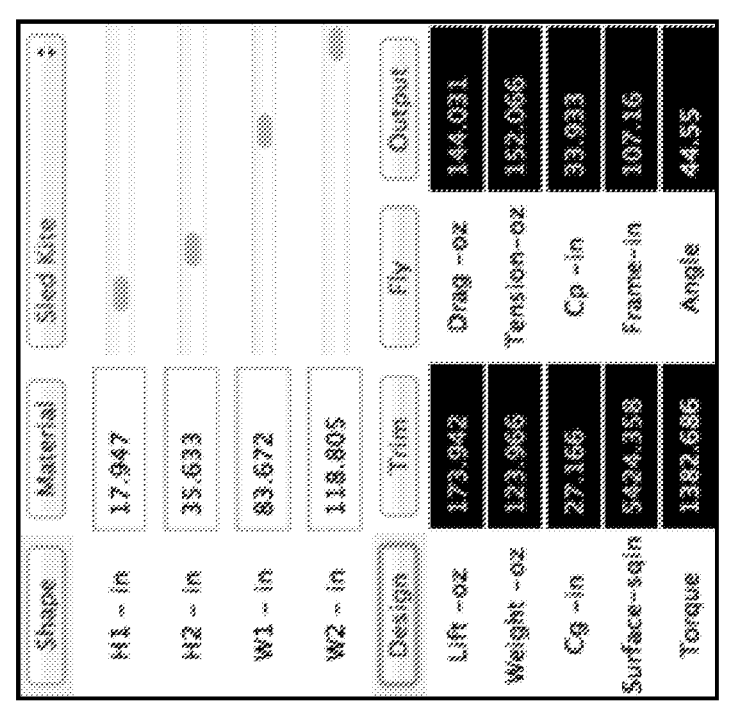
Figure 7:
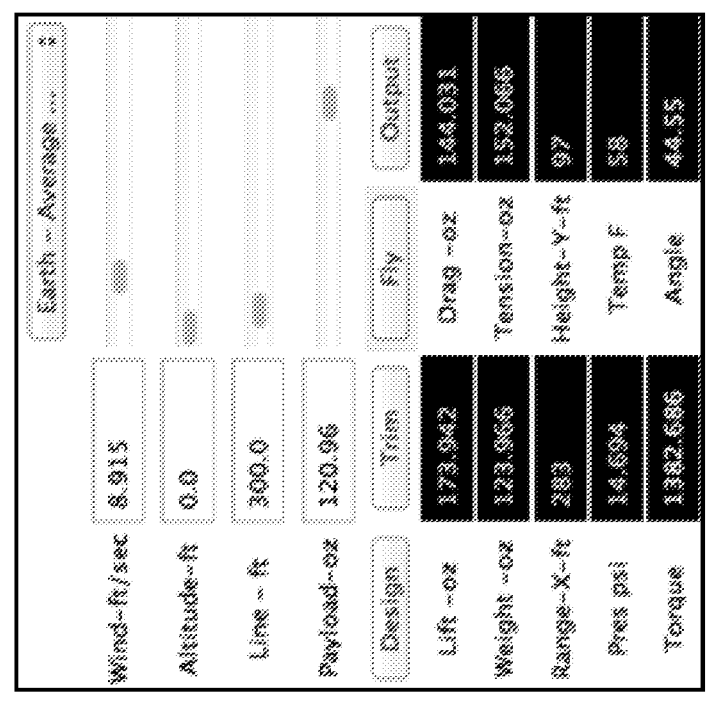

In an embodiment using a larger kite and a popular copter, calculations in FIGS. 6 and 7 show that the HQ Power Sled Kite (Large 3.0) (priced at approximately $129 plus $16 shipping from Amazon.com), when modified to include the launch-and-retrieval system described below, can lift a popular current quadcopter, the DJI™ Phantom 4 Pro, in a 6.1 mph wind. The Phantom 4 Pro weighs 3.06 pounds (just under 49 ounces). The HQ Power Sled is 320 cm by 138 cm (about 128 inches wide by 54 inches tall), and the outputs from NASA's KiteModeler program below show the HQ Power Sled should be able to lift a payload of 120.6 ounces in a 6.1 mph wind. This leaves 71.6 ounces (about 4.47 pounds) of lift available, even in this low wind and without any support from the Phantom 4 Pro rotors, to support the launch-and-retrieval system and compensate for any degradation in lift from aerodynamic inefficiencies arising from mounting that system. In order to use the Phantom 4 Pro, the following adjustments would be required for the launch-and-retrieval system described above for the much lighter U818A. As a threshold matter, in this embodiment, covers for the Phantom 4 Pro rotors may not be beneficial or useful for two reasons. First, the risk of collision with the supporting cords is relatively low because control over the Phantom 4 Pro is more precise than the U818A and the copter would always be launched toward the rear of the kite and would be retrieved by flying toward the rear of the kite. In normal operation, the rotors should not come in contact with any cords or the tail of the kite. Second, if the rotors did come into contact with either of the two heavy lines (250 pound test each) that are needed with the HQ Power Sled, it is unlikely that protection around the rotors would prevent a crash. Nevertheless, tangle protection could be accomplished, if desired, by forming balls or boxes around the rotors with open netting (like that from ping pong nets) and keeping that in place with carbon fiber rods or bent bamboo or by using tubes or coatings on the lines.

With regard to the launch-and-recovery platform, the box or enclosure described above for the U818A would have to be made stronger and larger, for example using three or more rectangular frames that are joined at the corners and sides with struts. Carbon fiber (or less-expensive fiberglass) rods (attached to form corners and joined with Kevlar™ thread and/or cable ties and Gorilla™ Glue) would be the best building material for the prototype. Skids shaped as described for the U818A (but sized for the Phantom 4 Pro) would be used with tubes and grooved funnels, also as described for the U818A. A sight would be set up to show on the FPV camera when the Phantom 4 Pro was aligned. Two servos would be used to lock the Phantom 4 Pro in place. Unlike the U818A, however, the front support of the lower portion of the frame would be removed to reduce any obstruction for the view of the Phantom 4 Pro's Camera when it is locked in position. This opening would be reinforced by struts on either side that joined the other two lower rods of the frame. A charging connection could be achieved as described above for the U818A. For launch, the servos would be activated to release the Phantom 4 Pro and push it slightly to the rear. Before this occurs, the Phantom 4 Pro rotors would be started in order to stabilize the copter and the kite. The Phantom 4 Pro could then be flown (backwards) out of the launch-and-retrieval system. Again, a safety line would be optional and could be fed from an automatic winder as described above.

Mounting the "sky mooring" with the launch-and-retrieval system is different with the HQ Power Sled than with the delta kite shown in FIG. 1. A support piece must be placed through a series of small holes along the bottom of the Power Sled with supporting cords (made from the 250 pound test Kevlar™ cord that is used as line for this kite) that run up each seam, over the top of the kite, and back down to the rod. In the prototype, these cords can be secured with Gorilla™ Tape to the seams. In a production version, the cords would be enclosed in pockets all along the seam, constructed when the seams are made. The frame for the sky mooring is then hung from this rod at the bottom of the kite using multiple large zip ties that are secured with polyurethane Gorilla™ Glue. Vertical carbon rods that extend below the sky mooring with small weights on the ends may be added to stabilize the sky mooring, particularly in heavy winds. The remote control radio, battery, servos, and wiring would all be mounted on the back of the sky mooring and secured in the prototype with zip ties and/or Kevlar™ cord, Gorilla™ Glue, and Gorilla™ Tape. In a production model, these parts would be built into a module across the top of the "sky mooring" that is enclosed in plastic and attached with screws to the top of the "sky mooring" frame.

In an even more sophisticated embodiment, the retrieval system could have an automated-docking-and-resetting feature. This system would extend functionality beyond the "return to home" feature, which is commonly included in copters in the same class as the Phantom 4 Pro, so copters could reliably be returned without manual landing procedures and could be reset remotely for later use without the need for access to the copters between "assignments."

In addition to the normal switch on the remote controller for a "return to home" application, which normally causes the copter to return to the vicinity of launch (using the onboard GPS) and execute a soft landing automatically, a "return to sky mooring" switch (or position on a multi-position switch) could be added to the controller for the copter or, optionally, on a separate controller for the sky mooring. Activating the "return to sky mooring" sequence would cause the copter to return to the original position and altitude when it was launched from the sky mooring and would then execute additional "search and acquire" actions to locate a "landing beam" that would lead it to a position at which it could "land" in the sky mooring and then be locked into position. The operator would retain the capability to exercise manual control over the copter, as well, to position the copter using the FPV camera, if needed. This feature could also be set to activate itself if the remote signal is lost of if battery power reaches a certain level.

More specifically, the programming of the flight control system in the Phantom 4 Pro (or a comparable sophisticated GPS-controlled multicopter) for "return to home" would be supplemented to achieve the "return to sky mooring" mode by requiring return to be at the same altitude as the launch position from the sky mooring and with the skids positioned (using the on-board compass) to face the receiving funnels. Depending on the precision capabilities of the "return to home" feature (and with an adjustment for wind that could be set by the operator remotely, compensated for by manual flight control, or, as described below, could be set automatically) the designated position would be adjusted so it would be a safe distance in front of and slightly above the sky mooring. The wind adjustment could be set automatically based on a signal from the sky mooring that is keyed to a wind speed indicator mounted on it.

The sky mooring could be equipped with at least two "guide lasers" that project beams with specific colors that could be easily detected by cameras with special filters on the copter. One of these lasers would be set to project a fan-shaped pattern (possibly by moving the beam back and forth rapidly) in a horizontal plane and the other would be set to project a "landing beam."

One, two, or more small (and light) cameras on the copter would be fitted with appropriate filters, mounted to face forward, and adjusted to detect the fan-shaped laser that designates the proper vertical position for the copter to move into the funnels or other hardware on the sky mooring that were designed to receive the copter's skids. This "altitude-hold camera system" would be connected with the altitude-hold software (already included in all copters of this class) to maintain the proper altitude for retrieval with more precision than an altimeter or GPS allows. If three cameras are used (or if one camera is programmed to detect three positions), the camera could provide feedback to hold altitude if the beam is detected in the specified "correct altitude" position, to lower the copter slightly by reducing thrust if the position is "high," and to raise the copter if the position is "low."

One, two or more separate small (and light) cameras would be positioned to detect the "landing beam" laser after the vertical position is set (and stabilized using the altitude-hold laser). A search to find the landing beam would be conducted by moving the copter left and right until the landing beam is found. Alternatively, one sophisticated camera could be programmed to perform both the function of locating the altitude-hold laser and the landing-beam laser.

The landing-beam laser would be adjusted so the copter should be positioned to fly forward at the same altitude and cause the skids to enter the funnels and then the tubes (as described above). One of several detection systems (including a simple switch activated when the skid of the copter presses against it at a specified location in a landing tube) could be used to determine when this has been achieved and, if not, to send the copter back to try again when the wind, movement of the sky mooring, or other factors cause the effort to fail. When properly adjusted (and in conditions with low wind or constant wind or with manual compensation by the operator), the automated-docking system should achieve retrieval and some variation of the locking system described above would then hold the copter in place and initiate the "post-mooring sequence" described below. In an embodiment in which the sky mooring is on a moving object, such as a kite, balloon, or hovering manned helicopter, a GPS on the sky mooring system might report its location to the receiver in the copter, which could then be programmed during the "return to sky mooring" sequence to proceed to the current location of the sky mooring if it has been moved from the original launch position. A person with ordinary skill in programming flight control systems for RC copters would be able to understand and implement this feature.

In a sophisticated system, the sky mooring might be programmed to take any other "post-mooring" actions to "reset" the copter, so it would be protected and prepared for use again. In addition to charging batteries as described above, these actions might include the automatic (or remotely controlled) opening and closure of a door or "lid" to protect the copter from wind, weather, vandalism, and theft until it is needed again (as illustrated in FIG. 26). Systems in the enclosure could also support remote or automatic initiation of a data connection (such as a remotely controlled plunger or motorized arm to plug a USB or other connection from the sky mooring enclosure into a matching port on the fuselage of the copter) that could allow remote rebooting and/or recalibration of the computer system(s) on the copter or downloading and transmission to the operator via the Internet or other means of photographs from an SD card in the camera (to allow higher resolution than the video sent back in flight). Other systems in an embodiment of this enclosure might permit remote activation of an "inspection camera" within the enclosure with the copter on a rotating base to allow remote inspection of the copter for damage (optionally with the copter on a rotating base to allow all sides to be examined), changing the payload modules as described above, remote replacement of damaged rotor blades, etc. It should be understood that a range of quasi-robotic maintenance or configuration operations become practical under remote control when a copter is returned to a closed sky mooring enclosure, and all of those embodiments are within the scope of this disclosure. For high-risk uses, such as along an international border or around a prison, the enclosure could be armored to reduce risk from rifle shots. The enclosure could have one or more external surveillance cameras, and the multicopter's own camera might be available remotely through a window in the closed door. The enclosure could be remotely rotated or tilted to angle the camera on the copter and so the flight path of the multicopter would be shorter when an event requires a dispatch for closer investigation.

While embodiments have been illustrated and described herein, it is appreciated that various substitutions and changes in the described embodiments may be made by those skilled in the art without departing from the spirit of this disclosure. The embodiments described herein are for illustration and not intended to limit the scope of this disclosure.

The invention claimed is:

1. A kite adapter comprising:
a spine;
a cross spar;
an opening in a fabric of the kite adapter to accommodate one or more rotors of a copter, wherein the opening is at an intersection of the spine and the cross spar;
an angled mount attached at the intersection of the spine and the cross spar;
a plurality of brackets to secure the copter to the kite adapter;
a handle; and
a line, wherein the line attaches the handle to the kite adapter.

2. The kite adapter of claim 1, wherein the spine is a straight vertical structure, and wherein the cross spar is a straight horizontal structure.

3. The kite adapter of claim 1, further comprising:
a bridle,
wherein the bridle is a string bridle.

4. The kite adapter of claim 1, further comprising:
a cord,
wherein the cord is a kite line, a rope, or a cable.

5. The kite adapter of claim 1, wherein the handle is a circular handle.

6. The kite adapter of claim 1, wherein the angled mount comprises holes to adjust the spine to change a position of the copter, and wherein the position of the copter comprises a flat position or an angled position.

7. The kite adapter of claim 1, further comprising:
a weight attached to the line.

8. The kite adapter of claim 1, wherein the kite adapter is a delta-shaped kite or a diamond-shaped kite.

9. The kite adapter of claim 8, wherein the delta-shaped kite or the diamond-shaped kite comprise of fabric material, and wherein the fabric material comprises one or more slits, one or more flaps, or a combination thereof.

10. The kite adapter of claim 1, wherein the plurality of brackets comprises one or more hook-and-loop fasteners, one or more releasable cable ties, a locking box, or a combination thereof to secure the copter to the kite adapter.

11. The kite adapter of claim 10, and, wherein the fabric material is attached to the kite adapter with the one or more hook-and-loop fasteners.

* * * * *